(12) United States Patent
Wessells et al.

(10) Patent No.: US 8,951,673 B2
(45) Date of Patent: Feb. 10, 2015

(54) HIGH RATE, LONG CYCLE LIFE BATTERY ELECTRODE MATERIALS WITH AN OPEN FRAMEWORK STRUCTURE

(75) Inventors: Colin Wessells, Eugene, OR (US); Robert Huggins, Stanford, CA (US); Yi Cui, Stanford, CA (US); Mauro Pasta, Ubiale Clanezzo (IT)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 4 days.

(21) Appl. No.: 13/482,793

(22) Filed: May 29, 2012

(65) Prior Publication Data

US 2012/0328936 A1    Dec. 27, 2012

Related U.S. Application Data

(60) Provisional application No. 61/499,877, filed on Jun. 22, 2011, provisional application No. 61/529,766, filed on Aug. 31, 2011.

(51) Int. Cl.
*H01M 4/58* (2010.01)
*H01M 10/054* (2010.01)
(Continued)

(52) U.S. Cl.
CPC .............. *H01M 10/054* (2013.01); *H01M 4/02* (2013.01); *H01M 4/505* (2013.01); *H01M 10/0525* (2013.01); *H01M 10/0568* (2013.01);
(Continued)

(58) Field of Classification Search
CPC ..... Y02E 60/122; Y02E 60/128; Y02E 60/13; H01M 4/0101; H01M 4/136; H01M 4/133; H01M 4/1393; H01M 4/1397; H01M 4/58; H01M 4/587; H01M 4/521; H01M 233/0005
USPC ........................................ 429/218.1, 188, 209
See application file for complete search history.

(56) References Cited

U.S. PATENT DOCUMENTS 5,209,980 A    5/1993  Spindler
5,383,089 A *  1/1995  Williams et al. .............. 361/502
(Continued)

FOREIGN PATENT DOCUMENTS

EP         0 086 555       8/1983
EP         0086555     *   8/1983
(Continued)

OTHER PUBLICATIONS

Stilwell et al. J. Appl. Electrochem. 22 (1992) 325-331.*
(Continued)

*Primary Examiner* — Ula C Ruddock
*Assistant Examiner* — Lisa S Park Gehrke
(74) *Attorney, Agent, or Firm* — Foley & Lardner LLP; Cliff Z. Liu

(57) ABSTRACT

A battery includes a cathode, an anode, and an aqueous electrolyte disposed between the cathode and the anode and including a cation A. At least one of the cathode and the anode includes an electrode material having an open framework crystal structure into which the cation A is reversibly inserted during operation of the battery. The battery has a reference specific capacity when cycled at a reference rate, and at least 75% of the reference specific capacity is retained when the battery is cycled at 10 times the reference rate.

22 Claims, 28 Drawing Sheets

(51) Int. Cl.
  *H01M 4/02* (2006.01)
  *H01M 4/505* (2010.01)
  *H01M 10/0525* (2010.01)
  *H01M 10/0568* (2010.01)
  *H01M 6/04* (2006.01)

(52) U.S. Cl.
  CPC .............. *H01M4/58* (2013.01); *H01M 6/045* (2013.01); *Y02E 60/122* (2013.01); *H01M 2300/0005* (2013.01)
  USPC ......... 429/221; 429/188; 429/218.1; 429/209

(56) References Cited

U.S. PATENT DOCUMENTS

| | | | |
|---|---|---|---|
| 5,744,258 | A | 4/1998 | Bai et al. |
| 5,824,434 | A | 10/1998 | Kawakami et al. |
| 6,482,548 | B2 | 11/2002 | Amatucci et al. |
| 6,558,846 | B1 | 5/2003 | Tsushima et al. |
| 6,824,923 | B2 | 11/2004 | Che et al. |
| 6,842,331 | B1 | 1/2005 | Kazaryan et al. |
| 6,924,063 | B2 | 8/2005 | Che et al. |
| 7,049,032 | B2 | 5/2006 | Tsushima et al. |
| 7,443,651 | B2 | 10/2008 | Ando et al. |
| 8,308,971 | B1 * | 11/2012 | Bhat et al. .................. 252/62.2 |
| 2002/0025449 | A1 | 2/2002 | Sukamto et al. |
| 2005/0058907 | A1 | 3/2005 | Kurihara et al. |
| 2007/0298253 | A1 | 12/2007 | Hata et al. |
| 2008/0143906 | A1 | 6/2008 | Allemand et al. |
| 2008/0145761 | A1 | 6/2008 | Petrat et al. |
| 2008/0276987 | A1 | 11/2008 | Flood |
| 2009/0004569 | A1 | 1/2009 | Yamamoto et al. |
| 2009/0035662 | A1 * | 2/2009 | Scott et al. ................ 429/231.5 |
| 2009/0087742 | A1 * | 4/2009 | Martinet et al. ............. 429/207 |
| 2009/0188697 | A1 | 7/2009 | Guiheen et al. |
| 2009/0317720 | A1 | 12/2009 | Richard |
| 2010/0028766 | A1 | 2/2010 | Peckerar et al. |
| 2011/0097624 | A1 | 4/2011 | Bhatt et al. |
| 2011/0104534 | A1 | 5/2011 | Wei et al. |
| 2011/0206998 | A1 | 8/2011 | Song et al. |

FOREIGN PATENT DOCUMENTS

| | | |
|---|---|---|
| EP | 0 949 702 | 8/2003 |
| WO | WO-2006/109909 | 10/2006 |

OTHER PUBLICATIONS

Kwon et al. Electrochem. Comm. 11 (2008) 137-140.*
Malik et al. Electrochim. Acta 45 (2000) 3777-3784.*
Kulesza et al. J. Electrochem. Soc. 146 (1999) 3757-3761.*
Grabner, E.W., et al., "Hexacyanoferrate layers as electrodes for secondary cells," J. Appl. Electrochem., 1987, vol. 17, pp. 653-656.
Honda, K., et al., "Prussian Blue Containing Nafion Composite Film as Rechargeable Battery," J. Electrochem. Soc., Jun. 1987, vol. 134, No. 6, pp. 1330-1334.
Jayalakshimi, F., et al., "Charge-discharge characteristics of a solid-state Prussian blue secondary cell," Journal of Power Sources, 2000, vol. 87, pp. 212-217.
Jayalakshimi, F., et al., "Performance characteristics of zinc hexacyanoferrate/Prussian blue and copper hexacyanoferrate/Prussian blue solid state secondary cells," Journal of Power Sources, 2000, vol. 91, pp. 217-223.
Kalwellis-Mohn, S., et al., "A Secondary Cell Based on Thin Layers of Zeolite-like Nickel Hexacyanometallates," Electrochimica Acta, 1989, vol. 34, No. 8, pp. 1265-1269.
Kaneko, M., et al., "A secondary battery composed of multilayer Prussian Blue and its reaction characteristics," J. Electroanal. Chem., 1988, vol. 255, pp. 45-52.
Neff, V.D., "Some Performance Characteristics of a Prussian Blue Battery," J. Electrochem. Soc., Jun. 1985, vol. 132, No. 6, pp. 1382-1384.
Tung, T., et al., "An Indium hexacyanoferrate-tungsten oxide electrochromic battery with a hybrid K+/H+-conducting polymer electrolyte," Solid State Ionics, 2003, vol. 165, pp. 257-267.
Wang, G.J., et al., "An aqueous rechargeable lithium battery based on doping and intercalation mechanisms," J Solid State Electrochem, 2010, vol. 14, pp. 865-869.
Whitacre, J.F., et. al., "Na4Mn9O18 as a positive electrode material for an aqueous electrolyte sodium-ion energy storage device," Electrochemistry Communications, 2010, vol. 12, pp. 463-466.
An et al., "Polypyrrole/carbon aerogel composite materials for supercapacitor," Journal of Power Sources 195: 6964-6969 (2010).
Cui, et al., "Electrochemical preparation, characterization and application of electrodes modified with hybrid hexacyanoferrates of copper and cobalt", Journal of Electroanalytical Chemistry, 526: 115-124, (2002).
Search Report from PCT/US2012/043621 dated Feb. 1, 2013.
Search Report from PCT/US2012/043624 dated Jan. 21, 2013.
Bocarsly, et al., "Effects of surface structure on electrode charge transfer properties", J. Electroanal. Chem., 140: 167-172, (1982).
Eftekhari, et al., "Potassium secondary cell based on Prussian blue cathode", Journal of Power Sources, 126: 221-228, (2004).
Kim, et al., "Polypyrrole/carbon composite electrode for high-power electrochemical capacitors", Electrochimica Acta, 52: 1727-1732, (2006).
Sinha, et al., "Reaction of nickel electrode surfaces with Aniomic metal-cyanide complexes: Formation of precipitated surfaces", Inorganic Chemistry, vol. 23, No. 2, pp. 203-212, (1983).
U.S. Appl. No. 61/495,318, filed Jun. 9, 2011, Vinay Bhat.
Buser, et al., "The Crystal Structure of Prussian Blue: Fe4[Fe(CN)6]3*xH2O", Inorganic Chemistry, 16:11, (1977) pp. 2704-2710.
Cui et al., Nano Lett., 23 (2011) pp. 5421-5425.
Huang et al., J. Power Sources 186 (2009) pp. 565-569.
International Preliminary Report on Patentability for International Application No. PCT/2012/043621 dated Dec. 23, 2013.
Itaya et al., "Spectroelectrochemistry and Electrochemical Preparation Method of Prussian Blue Modified Electrodes", J. Am. Chem. Soc., 104 (1982) pp. 4767-4772.
Orman et al., "Cobalt(III) Lithium Oxide, CoLiO2: Structure Refinement by Powder Neutron Diffraction", Acta Cryst., C40, (1984), pp. 12-14.
Padhi, A.K. et al., "Phospho-olivines as Positive-Electrode Materials for rechargeable Lithium Batteries," J. Electrochem. Soc., vol. 144, No. 4, Apr. 1997, pp. 1188-1194.
Pau et al., "Application of Stokes' Law to Ions in Aqueous Solution", J. Phys. Chem., 94, (1990), pp. 2671-2679.
Smith et al., "A Molecular Dynamics Simulation Study of LiFePO4/Electrolyte Interfaces: Structure and Li Transport in Carbonate and Ionic Liquid Electrolytes", Phys. Chem. Chem. Phys., 11, (2009), pp. 9884-9897.
US Non-final Office Action in U.S. Appl. No. 13/482,796 dated Oct. 9, 2013.

* cited by examiner

HIGH RATE, LONG CYCLE LIFE BATTERY ELECTRODE MATERIALS WITH AN OPEN FRAMEWORK STRUCTURE

CROSS-REFERENCE TO RELATED APPLICATIONS

This application claims the benefit of U.S. Provisional Application Ser. No. 61/499,877, filed on Jun. 22, 2011, and the benefit of U.S. Provisional Application Ser. No. 61/529,766, filed on Aug. 31, 2011, the disclosures of which are incorporated herein by reference in their entireties.

STATEMENT REGARDING FEDERALLY SPONSORED RESEARCH OR DEVELOPMENT

This invention was made with Government support under contract DE-AC02-76SF00515 awarded by the Department of Energy. The Government has certain rights in this invention.

FIELD OF THE INVENTION

The invention generally relates to batteries and, more particularly, electrode materials for aqueous electrolyte batteries.

BACKGROUND

To a large extent, recent research and development on battery technology has involved work on various versions of lithium-ion systems, and has been focused on small- to medium-scale applications, such as portable electronics and vehicle propulsion. Much less attention has been given to energy storage problems related to the large scale electrical power grid, despite costly transient outages, a rapidly growing need for frequency regulation, and the necessity for load balancing in concert with the integration of intermittent energy sources such as solar and wind. Instead of emphasizing large values of energy density and specific energy, these grid-scale energy storage applications demand high durability (e.g., long cycle life), high short term power output (e.g., high rate), and low cost.

Current solutions to address short term, high power requirements include traditional lead-acid batteries and certain advanced battery technologies. However, lead-acid batteries have insufficient cycle life and typically cannot withstand deep discharge. Common metal hydride/nickel batteries, which have excellent cycle life, are considered to be too expensive for use on a large scale, as are the sodium/sulfur and lithium-ion systems. In addition, these battery technologies typically show significant voltage hysteresis, and thus have reduced round-trip energy efficiencies when operated at high rates.

It is against this background that a need arose to develop the battery electrode materials and related methods and systems described herein.

SUMMARY

Embodiments of the invention relate to a class of open framework battery electrode materials that exhibit extreme durability and high rate capability. In some embodiments, the battery electrode materials are zeolithic mixed-conducting ionic compounds with relatively stiff framework structures into which hydrated cations from an electrolyte can be rapidly and reversibly inserted. Various members of this class of materials can be inexpensively synthesized using a spontaneous precipitation approach with low cost precursors, and the synthesis can be readily scaled up for grid-scale energy storage applications as well as other applications.

In one embodiment described as follows, the insertion of either sodium or potassium ions into a nickel hexacyanoferrate electrode results in very little lattice strain, and such an electrode can reversibly operate over thousands of deep discharge cycles at high current densities. At low to moderate charge and discharge rates, round-trip energy efficiencies are very high, such as over about 99.7%, and more than about 66% of a low rate discharge capacity is still available at a very high 42 C rate.

In another embodiment described as follows, a copper hexacyanoferrate electrode can be operated at very high rates in a safe and inexpensive aqueous electrolyte with excellent capacity retention over a very large number of cycles. After 40,000 deep discharge cycles at a 17 C rate (3.5 seconds per cycle), about 83% of an original capacity is still available. Even at a more extreme cycling rate of 83 C, about two thirds of its maximum discharge capacity is retained. At more modest current densities, round-trip energy efficiencies of about 99% (or more) can be achieved. Copper hexacyanoferrate can be synthesized using a highly scalable room temperature bulk precipitation approach. Its extreme durability, high rate capability, safe operation, and inexpensive production make this material a desirable battery electrode material for grid-scale energy storage.

In another embodiment described as follows, a battery includes: (1) a cathode; (2) an anode; and (3) an aqueous electrolyte disposed between the cathode and the anode and including a cation A. At least one of the cathode and the anode includes an electrode material having an open framework crystal structure into which the cation A is reversibly inserted during operation of the battery. The battery has a reference specific capacity when cycled at a reference rate, and at least 75% of the reference specific capacity is retained when the battery is cycled at 10 times the reference rate.

In a further embodiment described as follows, a battery includes: (1) a cathode including a cathode material; (2) an anode including an anode material; and (3) an aqueous electrolyte disposed between the cathode and the anode and including a cation A and a different cation A'. During operation of the battery, the cation A is reversibly inserted into the cathode material, and the cation A' is reversibly inserted into the anode material.

Other aspects and embodiments of the invention are also contemplated, including aspects and embodiments related to methods of manufacturing and operating the batteries described herein. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
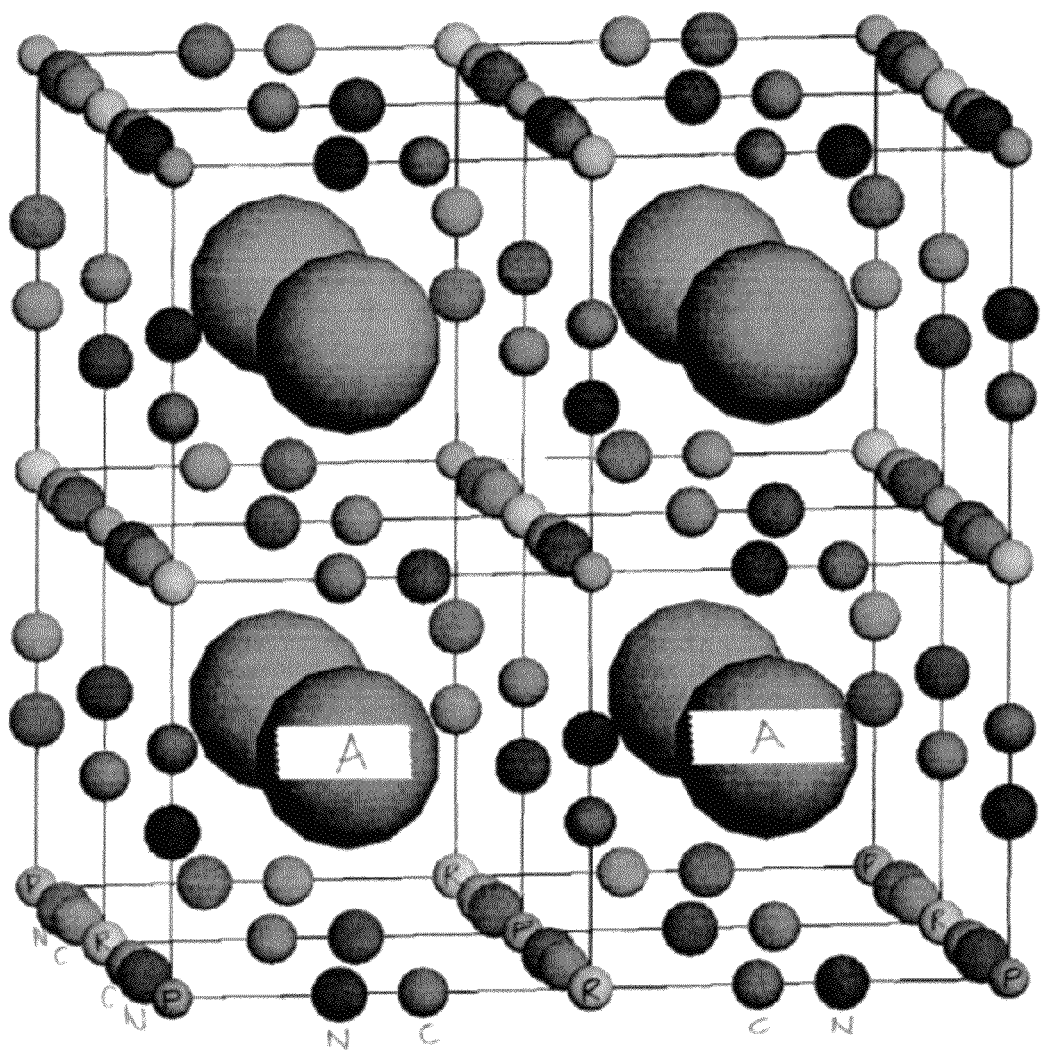
FIG. 1 illustrates the unit cell of a Prussian Blue crystal structure according to an embodiment of the invention.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Electrode Materials

Embodiments of the invention relate to battery electrode materials in which dimensional changes in a host crystal structure during charging and discharging are small, thereby affording long cycle life and other desirable properties. Such dimensional changes can otherwise result in mechanical deformation and energy loss, as evidenced by hysteresis in battery charge/discharge curves.

Some embodiments relate to a class of electrode materials having stiff open framework structures into which hydrated cations can be reversibly and rapidly intercalated from aqueous (e.g., water-based) electrolytes or other types of electrolytes. In particular, open framework structures with the Prussian Blue-type hexacyanometallate crystal structure afford advantages including greater durability and faster kinetics when compared to other intercalation and displacement electrode materials. A general formula for this class of materials is given by:

$$A_x P_y [R(CN)_{6-w} L_w]_z \cdot (H_2O)_n \quad (I)$$

where
  A corresponds to a cation that can be reversibly inserted into the crystal structure, such as selected from monovalent cations, divalent cations, and higher-valent cations;
  P corresponds to a metal and, in particular, a metal cation, such as selected from monovalent metal cations, divalent metal cations, and higher-valent metal cations;
  R corresponds to a metal and, in particular, a metal cation, such as selected from monovalent metal cations, divalent metal cations, and higher-valent metal cations;
  CN corresponds to a cyanide group and, in particular, a cyanide anion having a valence of 1 and an oxidation state of −1, namely $CN^{-1}$;
  L corresponds to a group that is optionally included to partially or fully replace $CN^{-1}$, such as selected from monovalent anions, divalent anions, and higher-valent anions;
  $H_2O$ corresponds to zeolitic water that can be present in the crystal structure;
  x, y, and z are related to achieve electrical neutrality according to valencies of A, P, R, CN, and L;
  $x \geq 0$, such as $x > 0$, $0 < x \leq 2$, or $0.5 \leq x \leq 1.5$;
  $y \geq 0$, such as $y > 0$, $0.5 \leq y \leq 1.5$, or $0.7 \leq y \leq 1.3$;
  $z \geq 0$, such as $z > 0$, $0.5 \leq z \leq 1.5$, or $0.5 \leq z \leq 1.1$;
  $0 \leq w \leq 6$, such as $0 < w \leq 6$; and
  $n \geq 0$, such as $n > 0$.

A material given by formula (I) can include A, P, R, CN, L, and $H_2O$, such that molar ratios of A, P, $[R(CN)_{6-w} L_w]$, and $H_2O$ can be represented as $A:P:[R(CN)_{6-w} L_w]:H_2O=x:y:z:n$, molar ratios of P and $[R(CN)_{6-w} L_w]$ can be represented as $P:[R(CN)_{6-w} L_w]=y:z$, molar ratios of P and R can be represented as $P:R=y:z$, molar ratios of P and CN can be represented as $P:CN=y:(6-w)\cdot z$, and molar ratios of P and L can be represented as $P:L=y:w\cdot z$. In the case $w=0$, molar ratios of A, P, and $[R(CN)_6]$ can be represented as $A:P:[R(CN)_6]=x:y:z$, molar ratios of P and $[R(CN)_6]$ can be represented as $P:[R(CN)_6]=y:z$, molar ratios of P and R can be represented as $P:R=y:z$, and molar ratios of P and CN can be represented as $P:CN=y:6z$.

In some embodiments, a crystal structure of a material given by formula (I) is analogous to that of the $ABX_3$ perovskites, with $P^{m+}$ and $R^{n+}$ cations in an ordered arrangement upon "B" sites. The occupancy of the tetrahedrally-coordinated "A" sites in the large cages in this crystallographically porous framework can vary from $x=0$ to $x=2$, with corresponding changes in the valence of one or both of the P and R species. As a result, such a material becomes a mixed ionic-electronic conductor. The insertion of a species of appropriate size into the "A" sites can be performed electrochemically with rapid kinetics. Specifically and in view of this crystallographically porous framework, a number of different hydrated cations can readily move into and out of the "A" sites. The species that is reversibly inserted from an electrolyte also can be exchanged, thereby allowing the implementation of electrodes in hybrid-ion aqueous electrolyte batteries. In some embodiments, the electrode potential range is at least partly determined by the identities of the A, P, and R species, and therefore can be adjusted or modified by changing their identities. For example, a reaction potential can decrease with increasing Stokes ionic diameter of the A species, and can increase with an effective ionic diameter of the A species.

FIG. 1 illustrates the unit cell of a Prussian Blue crystal structure according to an embodiment of the invention. In this structure, hexacyanometallate groups $(R(CN)_6)$ form a cubic framework with six-fold nitrogen-coordinated transition metal cations (P). Relatively large interstitial sites within this open framework can host cations (A), resulting in the formula of the form $APR(CN)_6$. The relative quantities of A, P, and $R(CN)_6$ can vary from unity with defects in the framework. The channels between the interstitial "A" sites and hydrated A cations such as potassium are similar in size, allowing their rapid transport throughout the lattice. Furthermore, electrochemical cycling over a full composition range results in minimal lattice strain. Consequently, electrode materials with this type of crystal structure show stable cycling for tens of thousands of cycles, with extremely high rate capability.

Referring to formula (I), examples of suitable A cations include: (1) $H^+$ (2) alkali metal cations (e.g., $Li^+$, $Na^+$, $K^+$, $Rb^+$ and $Cs^+$); (3) polyatomic, monovalent cations (e.g., $NH_4^+$); (4) alkaline earth metal cations (e.g., $Be^{2+}$, $Mg^{2+}$, $Ca^{2+}$, $Sr^{2+}$, and $Ba^{2+}$); and (5) polyatomic, divalent cations. In some embodiments, selection of a suitable A cation can be based on a size of the A cation relative to a size of interstitial sites and channels between the sites within the Prussian Blue crystal structure, which can be represented as a void having a diameter of about 3.5 Å. Because the A cation is typically hydrated in an aqueous electrolyte, it would be expected that a Stokes ionic diameter is the relevant measure of the size of the hydrated A cation, and thus a Stokes ionic diameter of about 3.5 Å is expected to represent an upper size limit for the A cation. Surprisingly, certain materials given by formula (I) also can accommodate A cations having a Stokes ionic diameter greater than 3.5 Å, albeit having an effective ionic diameter (e.g., a crystallographic diameter or other measure of size in the substantial absence of hydration) within, or no greater than, about 3.5 Å. Examples of A cations having a Stokes ionic diameter greater than 3.5 Å include $Li^+$, $Na^+$, $Mg^{2+}$, $Ca^{2+}$, and $Ba^{2+}$. The flexibility in accommodating such A cations affords a number of advantages, such as in terms of the selection of a desired electrode potential range and improved kinetics, as well as facilitating the implementation of hybrid-ion aqueous electrolyte batteries and affording cost advantages. Selection of a suitable hydrated A cation also can be based on a size of the A cation relative to a size of channels between interstitial sites.

Still referring to formula (I), examples of suitable P and R metal cations include: (1) cations of transition metals, such as top row (or row 4) transition metals (e.g., Ti, Va, Cr, Mn, Fe, Co, Ni, Cu, and Zn), row 5 transition metals (e.g., Y, Zr, Nb, Mo, Tc, Ru, Rh, Pd, Ag, and Cd), and other transition metals; (2) post-transition metals (e.g., Al, Ga, In, Sn, Tl, Pb, and Bi); (3) metalloids (e.g., B, Si, Ge, As, Sb, Te, and Po); and (4) lanthanides (e.g., La and Ce). In some embodiments, selection of a suitable P metal cation can be based on the metal cation having the capability to take on different oxidation states. Top row (or row 4) transition metals are examples of metals that can take on a variety of oxidation states. In some embodiments, selection of a suitable R metal cation can be based on the metal cation having the capability to take on different oxidation states, chemical stability of the hexacyanometallate group $R(CN)_6$, or a combination of these considerations. Fe, Mn, Cr, and Co are examples of metals that form stable hexacyanometallate groups. Examples of suitable L anions include monovalent anions, such as polyatomic, monovalent anions (e.g., $NO^-$ and $CO^-$). In some embodiments, selection of a suitable L anion can be based on chemical stability of its bonding with the R metal cation within the group $[R(CN)_{6-w}L_w]$.

Additional examples of suitable cations for A, P, and R can be categorized in terms of their valency and include: (1) monovalent cations (e.g., $Ag^+$, $Cu^+$, $Li^+$, $Na^+$, $K^+$, $Hg^+$, $Tl^+$, $NH_4^+$); (2) divalent cations (e.g., $Mg^{2+}$, $Ca^{2+}$, $Sn^{2+}$, $Sr^{2+}$, $Ba^{2+}$, $Zn^{2+}$, $Cd^{2+}$, $Fe^{2+}$, $Mn^{2+}$, $Cu^{2+}$, $Ni^{2+}$, $Co^{2+}$, $Pb^{2+}$, $Cr^{2+}$, $Hg^{2+}$, $Os^{2+}$, $Pd^{2+}$, $Rh^{2+}$, $Ru^{2+}$, $Ti^{2+}$, $Th^{2+}$, and $V^{2+}$); (3) trivalent cations (e.g., $Al^{3+}$, $Bi^{3+}$, $Ce^{3+}$, $Co^{3+}$, $Cr^{3+}$, $Cu^{3+}$, $Fe^{3+}$, $In^{3+}$, $Ir^{3+}$, $La^{3+}$, $Mn^{3+}$, $Mo^{3+}$, $Nb^{3+}$, $Ni^{3+}$, $Os^{3+}$, $Rh^{3+}$, $Ru^{3+}$, $Sb^{3+}$, $Ta^{3+}$, $Ti^{3+}$, $V^{3+}$, and $Y^{3+}$); and (4) tetravalent cations (e.g., $Ce^{4+}$, $Co^{4+}$, $Cr^{4+}$, $Fe^{4+}$, $Ge^{4+}$, $Mn^{4+}$, $Nb^{4+}$, $Ni^{4+}$, $Pb^{4+}$, $Ru^{4+}$, $Si^{4+}$, $Sn^{4+}$, $Ta^{4+}$, $Te^{4+}$, $Ti^{4+}$, $V^{4+}$, $W^{4+}$, and $Zr^{4+}$).

Specific examples of materials given by formula (I) include:

A is selected from $K^+$, $Li^+$, $Na^+$, $NH_4^+$, and $Ba^{2+}$, R is Fe, and P is selected from Fe, Cr, Mn, Co, Ni, Cu, Zn, Sn, and combinations thereof, such as Fe, Ni, Cu, and combination thereof;

A is selected from $K^+$, $Li^+$, $Na^+$, $NH_4^+$, and $Ba^{2+}$, R is Co, and P is selected from Fe, Mn, Co, Ni, Cu, Zn, and combinations thereof;

A is selected from $K^+$, $Li^+$, $Na^+$, $NH_4^+$, and $Ba^{2+}$, R is Mn, and P is selected from Fe, Mn, Co, Cu, Zn, and combinations thereof; and A is selected from $K^+$, $Li^+$, $Na^+$, $NH_4^+$, and $Ba^{2+}$, R is Cr, and P is selected from Fe, Cr, Mn, Co, Ni, and combinations thereof.

In formula (I), a mixture of different species can be included for any one or more of A, P, R, and L, such that formula (I) can be further generalized by: (1) representing A as $A_{x-a}A'_a$ or $A_{x-a'-a''} \ldots A'_{a'}A''_{a''} \ldots$; (2) representing P as $P_{y-p}P'_p$, or $P_{y-p'-p''} \ldots P'_{p'}P''_{p''} \ldots$; (3) representing R as $R_{1-r}R'_r$, or $R_{1-r'-r''} \ldots R'_{r'}R''_{r''} \ldots$; and (4) representing L as or $L_{w-l}L'_l$, or $L_{w-l'-l''} \ldots L'_{l'}L''_{l''} \ldots$. In the generalized version of formula (I), the different species for A can correspond to the same chemical element with different oxidation states, different chemical elements, or a combination thereof. Likewise, the different species for each of P, R, and L can correspond to the same chemical element with different oxidation states, different chemical elements, or a combination thereof.

Various materials given by formula (I) exhibit a number of desirable properties when implemented as electrode materials within batteries, including high efficiency, long cycle life, high rate capability, and high chemical stability.

For example, in terms of round-trip energy efficiency at a rate of 10 C (or another reference rate higher or lower than 10 C, such as 0.83 C, 8.3 C, 17 C, 42 C, or 83 C), batteries incorporating these electrode materials can have an energy efficiency (e.g., an initial or maximum energy efficiency or an average energy efficiency over a particular number of cycles, such as cycles 1 through 100 or cycles 1 through 1,000) that is at least about 75%, at least about 80%, at least about 85%, at least about 90%, at least about 95%, or at least about 98%, and up to about 99%, up to about 99.5%, up to about 99.9%, or more.

As another example, batteries incorporating these electrode materials can exhibit excellent retention of specific capacity over several charging and discharging cycles, such that, after 1,000 cycles to full discharge at a rate of 10 C (or another reference rate higher or lower than 10 C, such as 0.83 C, 8.3 C, 17 C, 42 C, or 83 C), at least about 75%, at least about 80%, at least about 85%, at least about 90%, at least about 95%, or at least about 98%, and up to about 99%, up to about 99.5%, up to about 99.9%, or more of an initial or maximum specific capacity is retained, and, after 10,000 cycles to full discharge at a rate of 10 C (or another reference rate higher or lower than 10 C, such as 0.83 C, 8.3 C, 17 C, 42 C, or 83 C), at least about 70%, at least about 75%, at least about 80%, at least about 85%, at least about 90%, or at least about 93%, and up to about 99%, up to about 99.5%, up to about 99.9%, or more of an initial or maximum specific capacity is retained. Likewise, batteries incorporating these electrode materials can exhibit excellent retention of round-trip energy efficiency over several charging and discharging cycles, such that, after 1,000 cycles or even after 10,000 cycles to full discharge at a rate of 10 C (or another reference rate higher or lower than 10 C, such as 0.83 C, 8.3 C, 17 C, 42 C, or 83 C), at least about 80%, at least about 85%, at least about 90%, at least about 95%, or at least about 98%, and up to about 99%, up to about 99.5%, up to about 99.9%, or more of an initial or maximum energy efficiency is retained.

As another example, batteries incorporating these electrode materials can exhibit excellent retention of specific capacity when cycled at high rates, such that, when cycled at a rate of 10 C (or another rate that is ten times a reference rate), at least about 75%, at least about 80%, at least about 85%, at least about 90%, or at least about 95%, and up to about 99%, up to about 99.5%, up to about 99.9%, or more of a maximum specific capacity or a low rate, reference specific capacity (e.g., at the reference rate of 1 C, 0.83 C, C/5, or C/10) is retained, and, when cycled at a rate of 100 C (or another rate that is hundred times the reference rate), at least about 50%, at least about 55%, at least about 60%, at least about 65%, or at least about 70%, and up to about 90%, up to about 95%, up to about 99%, or more of a maximum specific capacity or a low rate, reference specific capacity (e.g., at the reference rate of 1 C, 0.83 C, C/5, or C/10) is retained. Likewise, batteries incorporating these electrode materials can exhibit excellent retention of round-trip energy efficiency when cycled at high rates, such that, when cycled at a rate of 10 C (or another rate that is ten times a reference rate), at least about 75%, at least about 80%, at least about 85%, at least about 90%, or at least about 95%, and up to about 99%, up to about 99.5%, up to about 99.9%, or more of a maximum energy efficiency or a low rate, reference energy efficiency (e.g., at the reference rate of 1 C, 0.83 C, C/5, or C/10) is retained, and, when cycled at a rate of 100 C (or another rate that is hundred times the reference rate), at least about 50%, at least about 55%, at least about 60%, at least about 65%, or at least about 70%, and up to about 90%, up to about 95%, up to about 99%, or more of a maximum energy efficiency or a low rate, reference energy efficiency (e.g., at the reference rate of 1 C, 0.83 C, C/5, or C/10) is retained.

As a further example, various electrode materials given by formula (I) can exhibit high chemical stability over a wide pH range encompassing acidic conditions (e.g., pH's in the range of about 0 to about 6, about 1 to about 6, about 0 to about 5, about 2 to about 5, about 0 to about 3, or about 0 to about 2), neutral conditions (e.g., a pH of about 7), and basic conditions (e.g., pH's greater than about 7). In some embodiments, acidic conditions (e.g., an electrolyte having a pH that is no greater than or less than about 3, such as in the range of about 0 to about 3, about 0 to about 2.9, about 0 to about 2.7, about 0 to about 2.5, about 0 to about 2.3, about 0 to about 2, about 0.1 to about 1.9, about 0.3 to about 1.7, about 0.5 to about 1.5, about 0.7 to about 1.3, or about 0.9 to about 1.1) can be desirable to mitigate against solubility of certain electrode materials given by formula (I) at higher pH's. Such acidic conditions can correspond to optimized conditions for electrode materials that are in a bulk, powdered form.

Further mitigation against solubility of certain electrode materials given by formula (I) can be attained by the inclusion of one or more co-solvents in an electrolyte. In some embodiments, an electrolyte can include water as a primary solvent, and can further include one or more co-solvents having a reduced polarity relative to water. One measure of polarity of a solvent is given by its dielectric constant $\in$, with the dielectric constant of water given by $\in_{H2O}$ of about 80 at 20° C. Suitable co-solvents include those having a dielectric constant $\in_{co-solvent} < \in_{H2O}$ at a particular operational temperature, such as glycerine (or glycerol), with $\in_{glycerine}$ of about 47 at 20° C., ethylene glycol, with $\in_{EG}$ of about 37 at 20° C., and other organic solvents having dielectric constants less than about 80 at 20° C., such as no greater than about 78, no greater than about 75, no greater than about 70, no greater than about 65, or no greater than about 60, and down to about 30, down to about 25, down to about 20, down to about 15, or less. Other desirable properties of a co-solvent include having sufficient miscibility with water, having chemical stability in a desired operating potential range, and maintaining a sufficient level of solubility of an electrolyte salt. A single co-solvent can be included, or a combination of different co-solvents can be included. Each co-solvent can be included in an electrolyte in an amount of at least about 0.1% vol./vol. (or wt./wt.), such as at least about 0.5% vol./vol. (or wt./wt.), at least about 1% vol./vol. (or wt./wt.), at least about 2% vol./vol. (or wt./wt.), at least about 3% vol./vol. (or wt./wt.), at least about 4% vol./vol. (or wt./wt.), at least about 5% vol./vol. (or wt./wt.), or at least about 10% vol./vol. (or wt./wt.), and up to about 15% vol./vol. (or wt./wt.), up to about 20% vol./vol. (or wt./wt.), up to about 25% vol./vol. (or wt./wt.), up to about 30% vol./vol. (or wt./wt.), or more.

Various materials given by formula (I) can be synthesized using a spontaneous, bulk precipitation approach with low cost precursors, and the synthesis can be readily scaled up for applications such as grid-scale energy storage. For example, synthesis can be carried out by combining chemical precursors or other sources of A, P, R, CN, and L in an aqueous solution or another type of medium, with the precursors reacting spontaneously to form a powder product. In some embodiments, the chemical precursors can include a source of P (e.g., a salt of P) and a source of A and R(CN)$_6$ (e.g., a salt of A and R(CN)$_6$ such as A$_3$R(CN)$_6$). Synthesis can be carried out by co-precipitation, with substantially simultaneous dropwise addition of the precursors to a common liquid medium to maintain a substantially constant ratio of the precursors (e.g., a molar ratio of about 2:1 for the source of P and the source of A and R(CN)$_6$, or another molar ratio m:1 with m≥1, such as m>1 or m≥1.5) and to provide a consistent composition of a precipitate. Heating can be carried out, such as to a temperature above room temperature and below about 100° C. (e.g., in the range of about 40° C. to about 99° C., about 50° C. to about 90° C., or about 60° C. to about 80° C.), to yield better crystallinity in the final product, and an acid or a base also can be added to the reaction mixture to inhibit side reactions. A particular A used during synthesis can be exchanged by a different A' for implementation within a battery, thereby affording advantages such as the selection of a desired electrode potential range.

The resulting powder product can include particles having a grain size (e.g., an average or median grain size) no greater than about 10 μm, no greater than about 5 μm, no greater than about 1 μm, no greater than about 900 nm, no greater than about 800 nm, no greater than about 700 nm, no greater than about 600 nm, no greater than about 500 nm, no greater than about 400 nm, no greater than about 300 nm, no greater than about 200 nm, or no greater than about 100 nm, and down to about 20 nm, down to about 10 nm, down to about 5 nm, or less. Without wishing to be bound by a particular theory, small grain sizes can contribute towards improved kinetics and other desirable properties, such as by affording higher surface to volume ratios.

For implementation within a battery, the resulting powder product (e.g., about 80% by total weight) can be incorporated as an active material by mixing with a conductive carbon material (e.g., about 10% by total weight) and a binder (e.g., about 10% by total weight) to form a slurry, and this slurry can be deposited adjacent to a substrate, dried to form a coating, a film, or other layer adjacent to the substrate, and then assembled as an electrode into the battery. Examples of suitable conductive carbon materials include carbon black, acetylene black, graphite, vapor grown fiber carbon, and carbon nanotubes, and examples of suitable binders include polyvinylidene fluoride and other types of polymeric binders. A thickness of the coating (including the powder product as the active material) can be at least about 500 nm, at least about 1 μm, at least about 10 μm, at least about 20 μm, at least about 30 μm, at least about 40 μm, or at least about 50 μm, and up to about 150 μm, up to about 200 μm, up to about 300 μm, up to about 500 μm, or more. A mass loading of the active material within the resulting electrode can be at least about 500 μg/cm$^2$, at least about 700 μg/cm$^2$, at least about 1 mg/cm$^2$, at least about 2 mg/cm$^2$, at least about 3 mg/cm$^2$, at least about 4 mg/cm$^2$, or at least about 5 mg/cm$^2$, and up to about 10 mg/cm$^2$, up to about 15 mg/cm$^2$, up to about 20 mg/cm$^2$, up to about 30 mg/cm$^2$, up to about 50 mg/cm$^2$, up to about 100 mg/cm$^2$, or more.

Uses of Electrode Materials

The electrode materials described herein can be used for a variety of batteries and other electrochemical energy storage devices. For example, the electrode materials can be substituted in place of, or used in conjunction with, conventional electrode materials for aqueous electrolyte batteries or other types of batteries.

Figure 2:
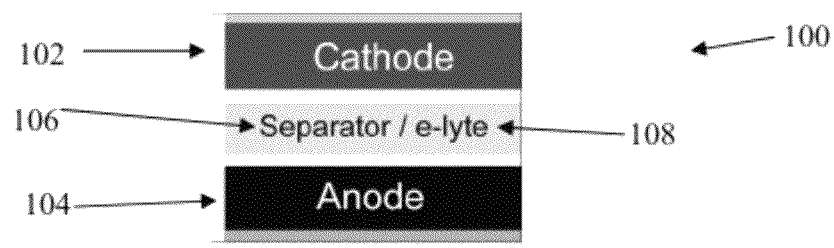
FIG. 2 illustrates a battery implemented in accordance with an embodiment of the invention.

FIG. 2 illustrates a battery 100 implemented in accordance with an embodiment of the invention. The battery 100 includes a cathode 102, an anode 104, and a separator 106 that is disposed between the cathode 102 and the anode 104. The battery 100 also includes an aqueous electrolyte 108, which is disposed between the cathode 102 and the anode 104. The use of the aqueous electrolyte 108 affords a number of advantages relative to organic solvent electrolytes, including higher safety, lower cost, capability for operation at higher power, and higher conductivity.

The operation of the battery 100 is based upon reversible intercalation of cations from the aqueous electrolyte 108 into at least one of the cathode 102 and the anode 104. Other implementations of the battery 100 are contemplated, such as those based on conversion or displacement chemistry. In the illustrated embodiment, at least one of the cathode 102 and the anode 104 is formed using an electrode material given by formula (I). For example, the cathode 102 can be formed using one type of electrode material given by formula (I) (e.g., represented as $A_xP_y[R(CN)_{6-w}L_w]_z\cdot(H_2O)_n$), and the anode 104 can be formed using another type of electrode material given by formula (I) (e.g., represented as $A'_xP'_y[R'(CN)_{6-w}L'_w]_z\cdot(H_2O)_n$). The ability of the electrode materials given by formula (I) to reversibly intercalate a variety of cations allows the battery 100 to be implemented as a hybrid-ion aqueous electrolyte battery, in which one electrode (e.g., the cathode 102) reacts with one type of cation, and another electrode (e.g., the anode 104) reacts with a different type of cation. One example is where the aqueous electrolyte 108 is a dual-ion electrolyte including $Na^+$ and $K^+$, the cathode 102 reacts with $Na^+$, and the anode 104 reacts with $K^+$. In addition to $Na^+/K^+$, other examples include combinations such as $H^+/Li^+$, $Na^+/Li^+$, $K^+/Li^+$, $H^+/Na^+$, $H^+/K^+$, as well as combinations including $NH_4^+$. The aqueous electrolyte 108 also can be implemented as a single-ion electrolyte, where the cathode 102 and the anode 104 react with the same type of cation. In other embodiments, the cathode 102 can be formed using an electrode material given by formula (I), and the anode 104 can be formed using another type of electrode material, such as one including a carbon-based material (e.g., activated carbon) or a mixture of a carbon-based material and a conductive polymer (e.g., polypyrrole).

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Copper Hexacyanoferrate

This example describes copper hexacyanoferrate ("CuHCF"), whose electrochemical reaction can be represented as $KCuFe^{III}(CN)_6 + xK^+ + xe^- = K_{1+x}Cu[Fe^{II}(CN)_6]_x[Fe^{III}(CN)_6]_{1-x}$. The theoretical specific capacity for anhydrous $KCuFe(CN)_6$ is about 85 mAh/g for some embodiments. In practice and for some embodiments, capacities of about 60 mAh/g and lower are generally observed, as the framework structure contains zeolitic water. Inductively coupled plasma mass spectrometry of CuHCF synthesized by a bulk precipitation reaction found a K:Cu:Fe ratio of about 0.71:1:0.72. Following previous conventions for the hydration of the crystal structure, the formula for the material on the basis of copper is $K_{0.71}Cu[Fe(CN)_6]_{0.72}\cdot3.7\ H_2O$. The theoretical specific capacity for the material with this formula is about 62 mAh/g, which agrees with the observed specific capacity. As the exact water content varies with temperature and humidity, a capacity of 60 mAh/g was used for the definition of C rates when describing current densities in this example.

Figure 3:
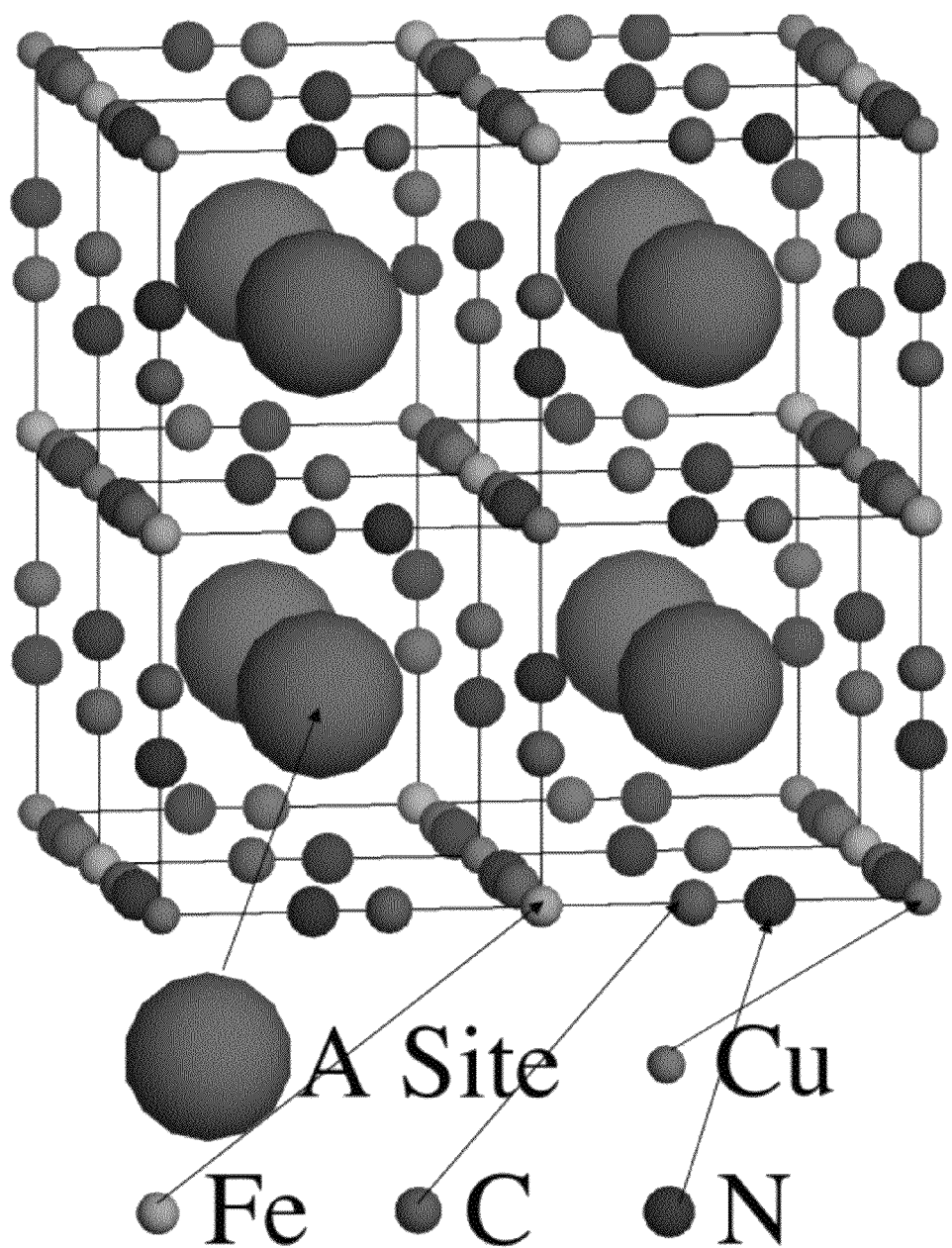
FIG. 3 illustrates the unit cell of copper hexacyanoferrate, which has the Prussian Blue crystal structure according to an embodiment of the invention.

CuHCF has the Prussian Blue crystal structure, in which octahedrally-coordinated transition metals such as Cu and Fe are linked by CN ligands, forming a face-centered cubic structure (see FIG. 3). Fe is six-fold carbon-coordinated, while Cu (e.g., $Cu^{2+}$) is six-fold nitrogen coordinated. Each of the eight subcells of the unit cell contains a large "A" site that can be occupied by zeolitic water or hydrated ions such as $K^+$. Hydrated ions can readily pass between one "A" site and the next through channels in the <100> directions. This three-dimensional network of "A" sites and channels allows for rapid transport of $K^+$ through the material with little disturbance of the crystal structure. Full occupancy of the "A" sites, as shown in FIG. 3, occurs when the material is fully reduced. Zeolitic water is omitted for clarity.

Figure 9:
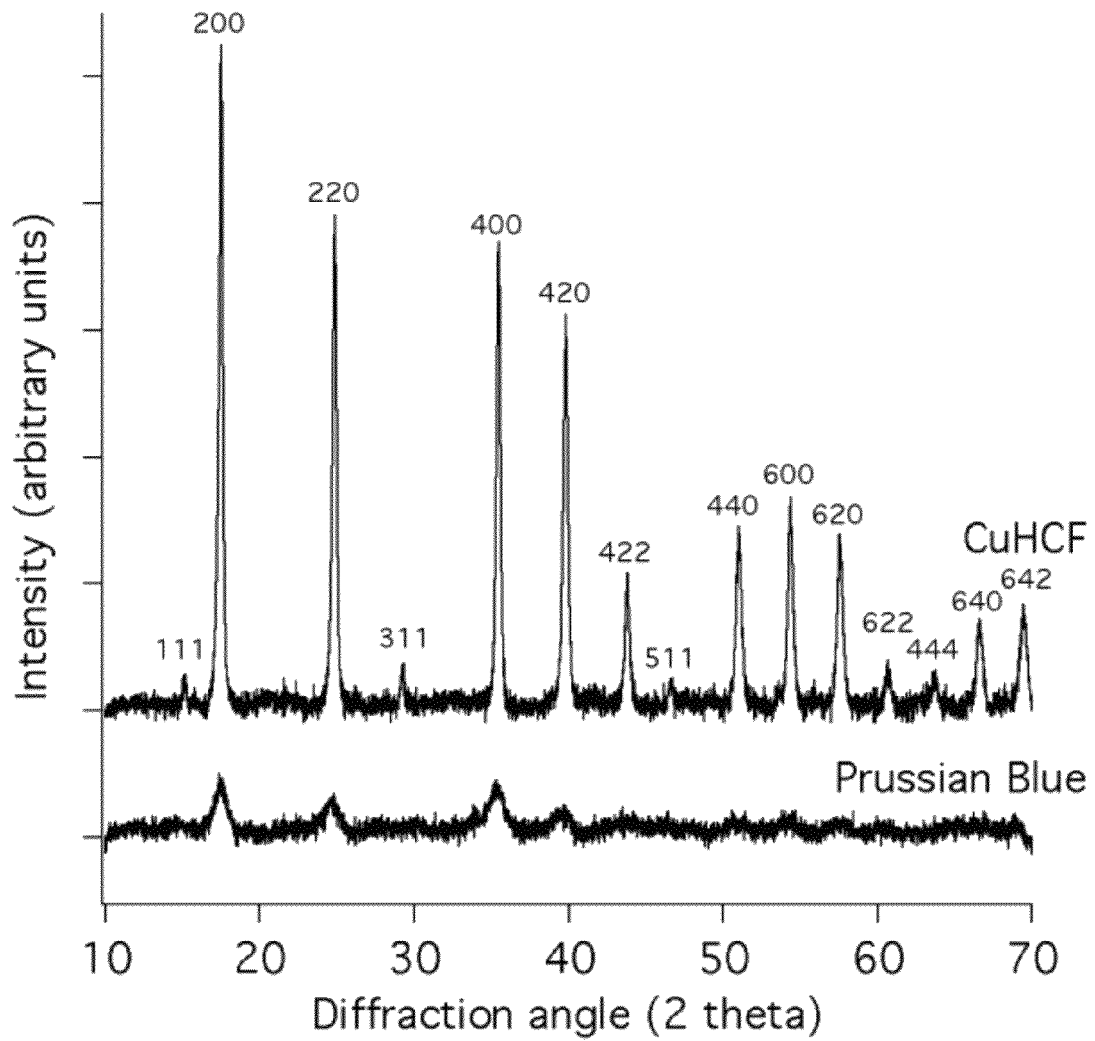
FIG. 9 illustrates the wide-angle powder X-ray diffraction spectra of co-precipitated copper hexacyanoferrate according to an embodiment of the invention and Prussian Blue (nominally $KFe^{3+}Fe^{2+}(CN)_6$). Due to the extreme insolubility of Prussian Blue, it precipitates too rapidly to form crystalline nanoparticles. However, copper hexacyanoferrate precipitates more slowly, allowing for the formation of a highly crystalline product. The spectrum of copper hexacyanoferrate is fully indexed to a FCC (Space Group Fm-3m) structure, with substantially no impurities.

Bulk CuHCF powder was synthesized by simultaneous dropwise addition of 120 mL of 0.1 M $Cu(NO_3)_2$ (Alfa Aesar) and 120 mL of 0.05 M $K_3Fe(CN)_6$ (Sigma Aldrich) to 60 mL $H_2O$ during constant stirring. A brown precipitate formed almost immediately. After sonicating for 20 minutes, the suspension was allowed to sit for six hours. The precipitate was then filtered, washed with water, and dried in vacuum at room temperature. Co-precipitation of CuHCF in the presence of excess $Cu^{2+}$ proceeds slowly, allowing for ordered growth of highly crystalline, polydisperse nanoparticles of 20-50 nm (see FIG. 9). These CuHCF nanoparticles readily precipitate into larger agglomerations, which can be easily filtered and processed for use in battery electrodes. The powder product was used for X-ray diffraction ("XRD") and Transmission electron microscope ("TEM") measurements. To prepare electrodes, a mixture of 80% wt./wt. CuHCF, 9% wt./wt. amorphous carbon (Timcal Super P Li), 9% wt./wt. polyvinylidene fluoride (Kynar HSV 900), and 2% wt./wt. graphite (Timcal KS6) was ground together by hand until a homogeneous black powder formed. A slurry containing this mixture and 1-methyl-2-pyrrolidinone was spread on carbon cloth (Fuel Cell Earth) current collectors with mass loading of at least 10 mg $CuHCF/cm^2$. The electrodes were dried in air at 100° C.

Electrochemical measurements were performed in flooded three-electrode cells containing an electrolyte of aqueous 1 M $KNO_3/0.01M\ HNO_3$ with a pH of about 2, a working electrode containing CuHCF, a Ag/AgCl reference electrode, and a counter electrode containing a large mass of partially reduced CuHCF or Prussian Blue. The counter electrode acted as a reversible sink for potassium ions, and is analogous to the use of lithium foil counter electrodes during the study of electrode materials for lithium-ion batteries. Its large mass (about fifty times that of the working electrode) ensured that the capacity of the cell was primarily limited by the mass of the working electrode. To prepare counter electrodes containing Prussian Blue, $Fe(NO_3)_3$ and $K_4Fe(CN)_6$ were substituted for the above precursors, and the chemical synthesis was performed at 80° C. A preconditioning potential of 0.4 V vs. standard hydrogen electrode ("S.H.E.") was applied to partially reduce the Prussian Blue before its insertion into the full cell as a counter electrode.

Figure 4:
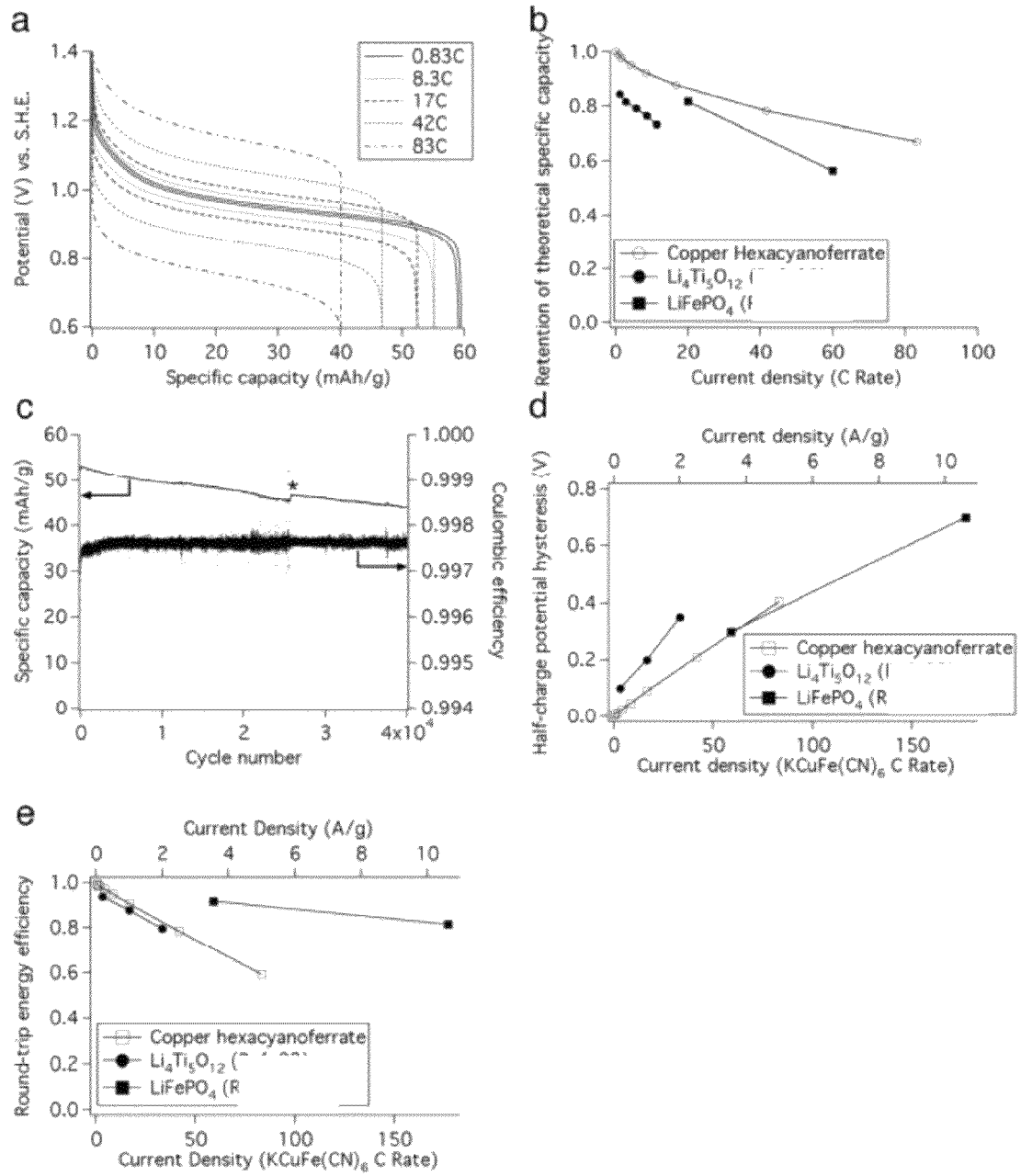
FIG. 4 illustrates the electrochemical characterization of copper hexacyanoferrate according to an embodiment of the invention. a: Galvanostatic cycling of copper hexacyanoferrate at various current densities between 0.6 and 1.4 V vs. S.H.E. showed a maximum specific capacity of about 59.14 mAh/g centered at about 0.946 V. b: The capacity retention of copper hexacyanoferrate at high current densities is greater than those of $LiFePO_4$ and $Li_4Ti_5O_{12}$, two commonly studied lithium-ion electrodes. c: Long-term cycling of copper hexacyanoferrate at a 17 C rate between 0.8 and 1.2 V vs. S.H.E. shows about 83% capacity retention after 40,000 cycles, with about 99.7% coulombic efficiency. Additional electrolyte was added to the cell after 25,000 cycles to counteract evaporation (denoted by asterisk). d: The voltage hysteresis of copper hexacyanoferrate between the potentials during charging and discharging at a half-charge state is lower than that of $Li_4Ti_5O_{12}$, and comparable to that of $LiFePO_4$ when normalized for current density. e: The low voltage hysteresis of copper hexacyanoferrate results in round-trip energy efficiency comparable to the best lithium-ion half cells.

The mid-composition reaction potential of CuHCF during potassium intercalation was found to be about 0.946 V with respect to S.H.E. (see FIG. 4a). The potential profile indicates a solid solution intercalation reaction. During cycling at a rate of 0.83 C, a capacity of about 59.14 mAh/g was observed, and about 67% of this capacity, about 40.1 mAh/g, was retained during cycling at a rate 100 times greater, namely 83 C (see FIG. 4b). This capacity retention at high current densities compares favorably with that of two common lithium-ion battery electrode materials, $LiFePO_4$ and $Li_4Ti_5O_{12}$. While the specific capacity of CuHCF in this example is less than that of those common lithium-ion cathode materials, that parameter is less important for stationary applications, such as in conjunction with grid-scale storage. Parameters of greater importance for stationary applications are high rate performance, cycle life, and cost.

In addition to its excellent capacity retention at high current densities, CuHCF has a much greater cycle life than other previously demonstrated battery electrodes. During galvanostatic cycling between 0.8 and 1.2 V vs. S.H.E. at a current density of 17 C (see FIG. 4c), about 94.6% of the initial discharge capacity of about 52.2 mAh/g was retained after 10,000 cycles, and about 83% was retained after 40,000 cycles. The coulombic efficiency was above about 99.7% for the duration of that cycling. Additional electrolyte was added to the cell after about 25,000 cycles to counteract evaporation during open cell tests. In comparison, commercial lithium-ion batteries rarely last more than several hundred deep cycles, lead-acid batteries may endure up to about a thousand cycles of shallow (50%) discharging, and the best vanadium flow batteries reach about 5,000 cycles at 70% discharge.

Figure 10:
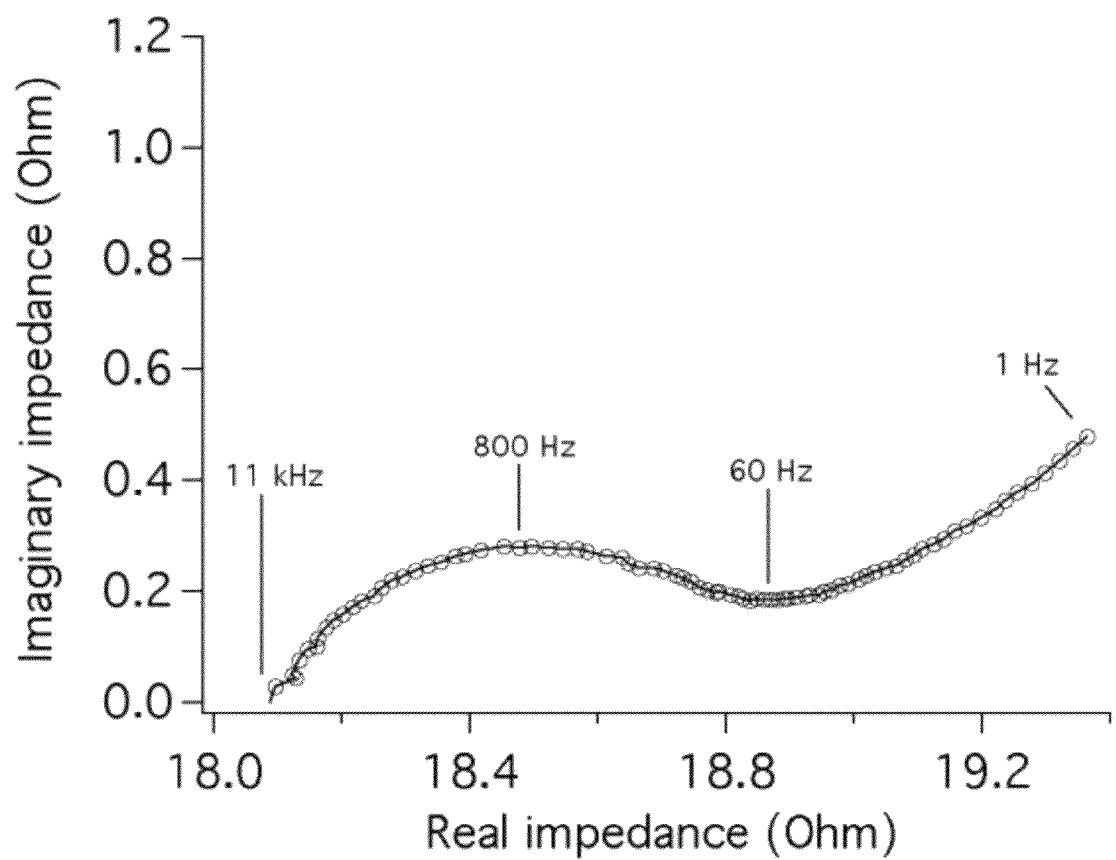
FIG. 10 illustrates the electrochemical impedance spectrum of copper hexacyanoferrate that was measured using the same cell that was used to determine the high-rate performance of copper hexacyanoferrate according to an embodiment of the invention. The electrolyte resistance is about 18Ω, typical for flooded aqueous cells. The charge transfer resistance of this electrode was about 0.7Ω, corresponding to about 1 Ω/cm², and the double layer capacitance was about 1.8 mF, corresponding to about 2.5 mF/cm².

Experiments were undertaken to investigate the physical process that controls the kinetic behavior of CuHCF during high rate cycling. Impedance spectroscopy measurements using the same flooded cell geometry as that during galvanostatic cycling showed a charge transfer resistance of about 1 $\Omega/cm^2$, with a double layer capacitance of about 2.5 mF/cm$^2$ (see FIG. 10). The hysteresis observed between the potential during charging and discharging at the half-charged state increased linearly with the current density, indicating that the electrolyte resistance probably dominates the cell impedance. At a cycling rate of C/6, the charge/discharge voltage difference at the half-charged state was about 4.4 mV. It increased to about 47 mV at a 8.3 C rate, and to about 405 mV at a 83 C rate (see FIG. 4d). Thus, the kinetic behavior is impacted by the resistance of the electrolyte, rather than by the transfer of charge carriers in and out of the electrode material. Adoption of a pressed cell geometry that reduces electrolyte resistance can improve the kinetic behavior. The magnitudes of this voltage hysteresis compare favorably with those of the best lithium-ion electrodes. Recent results showed 700 mV hysteresis during 60 C cycling of lithium iron phosphate, and 350 mV hysteresis during 13 C cycling of the lithium titanium oxide $Li_4Ti_5O_{12}$.

The unusually small voltage hysteresis of CuHCF means that it can be cycled with high round-trip energy efficiency. To illustrate this point, one can consider a hypothetical full cell containing a CuHCF electrode and a fixed-potential counter electrode at a potential of one volt below the mid-charge reaction potential of CuHCF. Using the observed coulombic efficiency of about 99.7% and C/6 voltage hysteresis of about 4.4 mV for CuHCF, this hypothetical cell has an energy efficiency of over about 99% during cycling at a C/6 rate (see FIG. 4e). In spite of the increase in voltage hysteresis at higher current densities, the round-trip energy efficiency for this hypothetical cell is still about 95% at an 8.3 C rate (see FIG. 4e). These values of energy efficiency of full cells containing CuHCF would far surpass the efficiencies observed for some conventional battery systems.

Figure 5:
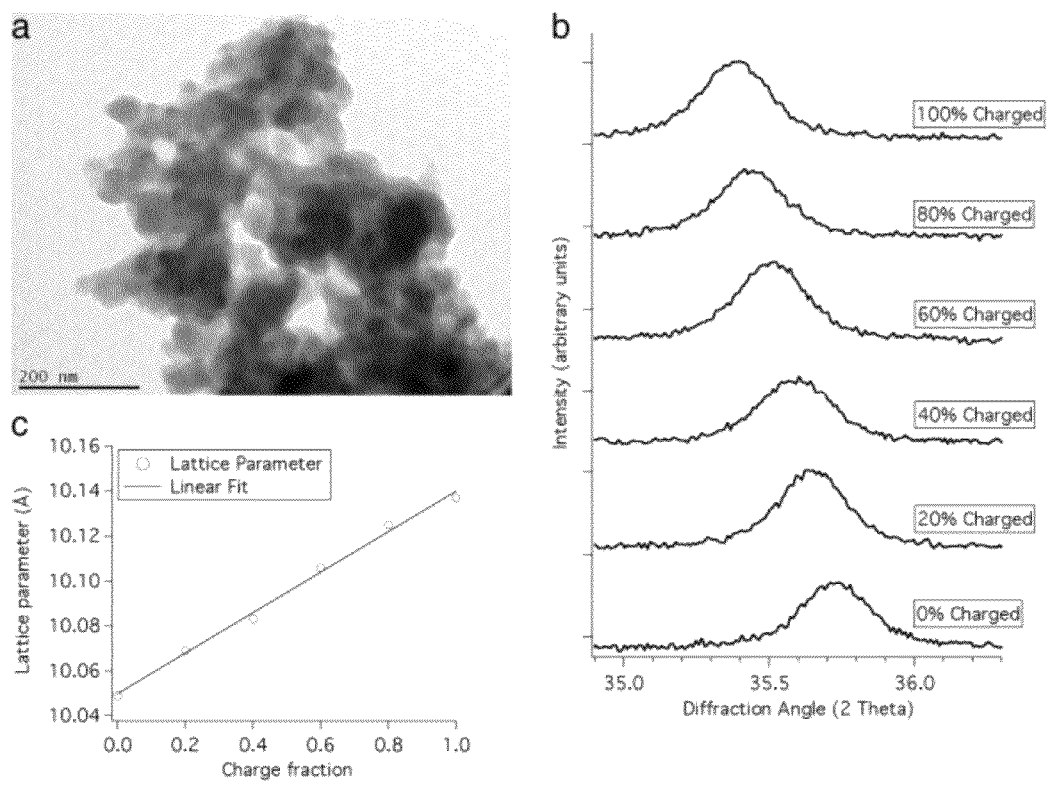
FIG. 5 illustrates the physical characterization of copper hexacyanoferrate according to an embodiment of the invention. a: Transmission electron microscope image of copper hexacyanoferrate shows agglomerations of 20-50 nm grains. b: The increase in the lattice parameter of copper hexacyanoferrate during charging is illustrated by the shift of the 400 diffraction peak to smaller angles. c: The lattice parameter of copper hexacyanoferrate varies linearly between about 10.04 and about 10.14 Å during charging, with a total strain of about 0.9%.

The physical properties of CuHCF were characterized using TEM and powder XRD. The polydisperse 20-50 nm particle sizes were found during the TEM imaging (see FIG. 5a). The small particle size allows rapid access of the entire structure to inserted ions, which contributes to the high capacity retention and energy efficiency during cycling at high current densities. The crystal structure of CuHCF was determined to be face-centered cubic with a lattice parameter of about 10.1 Å. The lattice parameter was found to increase with the charge state of the material, as illustrated by a diffraction peak shift to smaller diffraction angles during charging (see FIG. 5b). While the position of each diffraction peak shifted with charge state, no new peaks appeared during charging. This confirms that the electrochemical cycling of CuHCF is a single-phase reaction. The about 0.9% increase in lattice parameter (see FIG. 5c) from the fully reduced to fully oxidized state is explained by the increase in the radius of the $[Fe^{2+}(CN)_6]^{-4}$ group during its oxidation to $[Fe^{3+}(CN)_6]^{-3}$. The ultra-long cycle life of CuHCF is due, at least in part, to a stable crystal structure that undergoes a small, isotropic lattice strain during cycling. Ex-situ XRD measurements were carried out as follows. Electrodes containing CuHCF were first fully discharged by fixing their potentials at 0.4 V vs. S.H.E. until the discharge current decayed to zero. Electrodes were then charged galvanostatically at a 1 C rate until the desired charge state was reached. The electrodes were removed from the cell, and their diffraction spectra measured. The lattice parameter of each sample was determined using a Treor fitting algorithm in the X'Pert Highscore Plus software package.

Unlike the metal oxides and phosphates found in current lithium-ion battery electrodes, open frameworks with the Prussian Blue crystal structure can be synthesized in bulk at room temperature by spontaneous precipitation from aqueous solutions containing transition metal salts and hexacyanometallate precursors. During the work reported in this example, several grams of CuHCF were formed during each synthesis, and the synthesis is highly scalable.

Extremely long cycle life, high rate capability and round-trip energy efficiency, and inexpensive bulk synthesis make Prussian Blue analogues such as CuHCF very attractive for use in batteries for grid-scale energy storage. In addition, materials with this structure can be operated in inexpensive, safe, and highly conductive aqueous electrolytes. Thus, batteries relying on Prussian Blue-type materials enjoy a number of advantages when compared to current lithium-ion cells, without suffering from the safety concerns related to flammable organic electrolytes.

Example 2

Nickel Hexacyanoferrate

This example describes nickel hexacyanoferrate ("NiHCF"), whose electrochemical reaction can be represented as $ANiFe^{III}(CN)_6 + A^+ + e^- = A_2NiFe^{II}(CN)_6$, where $A^+$ is a cation such as sodium or potassium. The following describes the unusual behavior of a high capacity battery electrode containing bulk NiHCF powder prepared by a chemical precipitation method.

Figure 6:
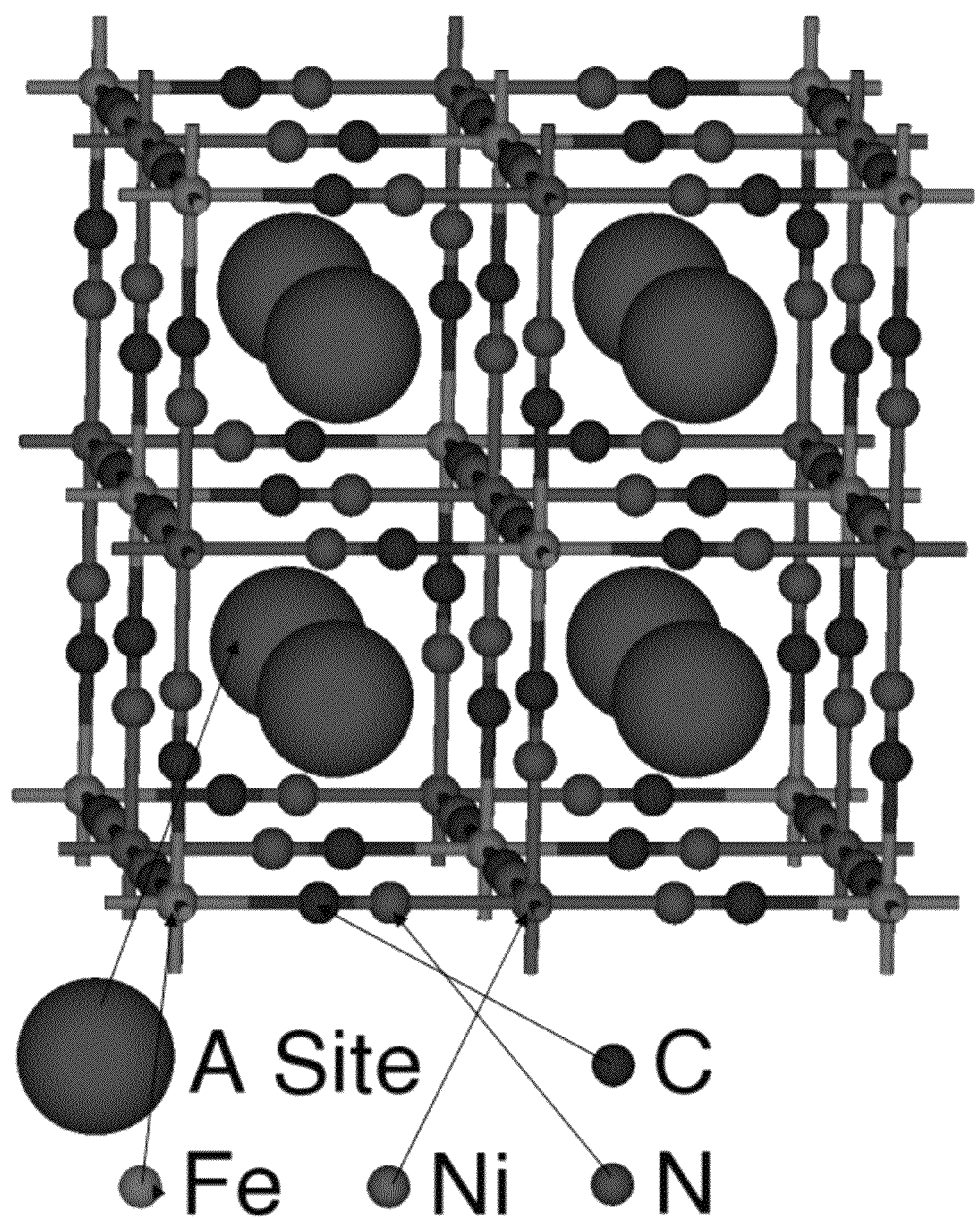
FIG. 6 illustrates the unit cell of nickel hexacyanoferrate, which has the Prussian Blue crystal structure according to an embodiment of the invention.

NiHCF has the Prussian Blue crystal structure, in which transition metal cations such as Fe and Ni are bound by bridging CN ligands, forming a face-centered cubic structure (see FIG. 6). In the case of NiHCF, Fe is six-fold carbon coordinated, while Ni (e.g., $Ni^{2+}$) is six-fold nitrogen coordinated. The resulting framework has large channels oriented in the <100> directions, through which hydrated cations such as $K^+$ and $Na^+$ can diffuse. These cations occupy the interstitial "A" sites at the center of each of the eight subcells of the unit cell. Full occupancy of the "A" sites is achieved upon full reduction of the material to $A_2NiFe^{II}(CN)_6$. Zeolitic water also occupies the structure, but is omitted here for clarity.

NiHCF powder was synthesized following a similar procedure used to synthesize CuHCF described in Example 1. Instead of a copper precursor, reagent grade $Ni(NO_3)_2$ (Sigma Aldrich) was used. NiHCF was synthesized by a co-precipitation method that ensured consistent reaction conditions. Slow, simultaneous dropwise addition of aqueous precursors to a common liquid medium maintains a substantially constant ratio of reactants, ensuring a consistent composition of a precipitate. The reaction was performed at 70° C. because NiHCF synthesized at room temperature had poor crystallinity for some embodiments. Electrodes containing NiHCF were made using a similar procedure as previously described. The mass loading of electrodes was between about 7 and about 12 mg/cm$^2$.

Electrochemical cycling of electrodes containing NiHCF powder was performed in aqueous 1 M NaNO$_3$ or 1 M KNO$_3$ (Sigma Aldrich). Dilute HNO$_3$ was added to the electrolytes to attain a pH of about 2. Three-electrode flooded cells containing a Ag/AgCl reference electrode and a counter electrode containing a large, partially discharged mass of NiHCF were used. This counter electrode acted as a reversible ion sink, similar to the large masses of lithium foil used during half-cell tests of lithium-ion electrodes. The as-synthesized NiHCF is initially fully oxidized, with a high open circuit voltage. However, to avoid potassium contamination during experiments in the sodium electrolyte, mobile cations were removed from the counter electrodes by fixing their potentials at 1.0 V for 30 minutes in the desired electrolyte. After washing with water, partial discharging was carried out in fresh electrolyte by fixing the potential at the half-discharge potential of NiHCF (e.g., about 0.59 V for sodium insertion). NiHCF was found to react with sodium at about 0.59 V vs. S.H.E., while its reaction with potassium occurs at about 0.69 V (see FIGS. 7a & b). This indicates a trend to higher reaction potentials for the insertion of heavier alkali ions. For some embodiments, the theoretical capacity of NiHCF can be difficult to determine with precision because the zeolitic water content varies with temperature and humidity. The theoretical capacities of these materials can also vary by ten percent or more, depending on the concentration of defects in the framework structure. For this example, a current density of 60 mA/g is defined as 1 C.

The open framework structure of NiHCF permits rapid kinetics during the cycling of both sodium and potassium. During either sodium or potassium cycling, a specific capacity of about 59 mAh/g was observed at a C/6 rate (see FIG. 7c). Virtually all of this capacity is accessible in a small 0.3 V range around the half-charge reaction potential. During sodium cycling, about 86.5% of this maximum capacity is retained at a rate of 8.3 C, and about 67% is still retained at a 41.7 C rate. NiHCF behaves similarly during potassium cycling: about 85.5% of its maximum capacity is retained at 8.3 C, and about 66% is retained at 41.7 C. The capacity retention of NiHCF at high current densities is comparable to the best reported rate performance of conventional lithium-ion battery electrode materials. For example and over a one-volt cycling window between 3.0 and 4.0 V vs. Li$^+$/Li, it has been reported that LiFePO$_4$, a common lithium-ion cathode material, retains about 70% of its theoretical capacity at a 20 C rate.

Figure 7:
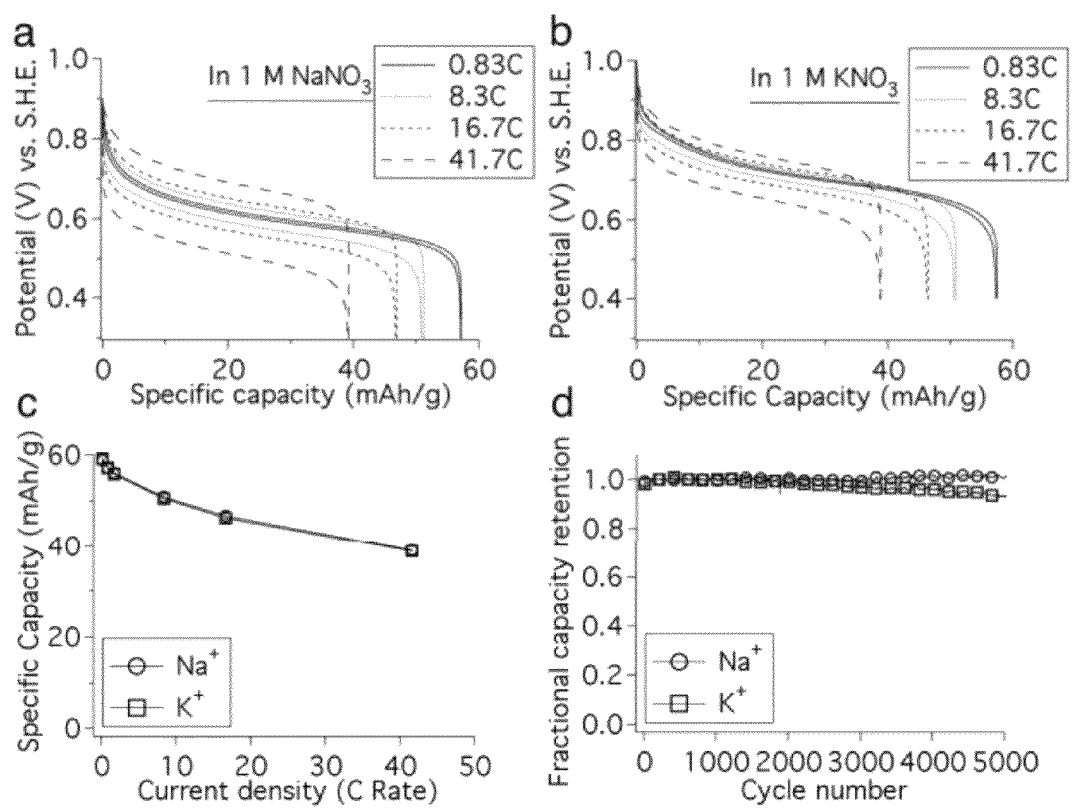
FIG. 7 illustrates the electrochemical characterization of nickel hexacyanoferrate according to an embodiment of the invention. a, b: The potential profiles of nickel hexacyanoferrate during galvanostatic cycling of $Na^+$ and $K^+$ at various rates are shown. The potential profiles during both $Na^+$ and $K^+$ cycling show that the reversible reduction of fully charged nickel hexacyanoferrate proceeds by an insertion reaction, during which $Na^+$ and $K^+$ are miscible over a wide composition range in the stable open framework structure. Specific capacities of about 59 mAh/g were observed at a C/6 rate (see c, omitted from a and b for clarity), so about 60 mA/g was defined as a 1 C rate. c: The capacity of nickel hexacyanoferrate during galvanostatic cycling of $Na^+$ and $K^+$ at various rates is shown. About two thirds of the capacity observed at a C/6 rate is retained at 41.7 C. d: Nickel hexacyanoferrate shows essentially no capacity loss after 5,000 cycles of $Na^+$ insertion at a 8.3 C rate. During $K^+$ cycling, nickel hexacyanoferrate is stable for about 1,000 cycles, after which its capacity decays at a rate of about 1.75%/1,000 cycles.

NiHCF has low voltage hysteresis between charge and discharge during either sodium or potassium cycling (see FIGS. 7a & b). The voltage hysteresis at a half-charged state during sodium cycling is about 12.7 mV at 0.83 C (about 0.4 mA/cm$^2$). At the same current density in potassium electrolyte, the half-charge voltage hysteresis of NiHCF is about 8 mV. This voltage hysteresis increased linearly with current density, and during 41.7 C cycling (about 18 mA/cm$^2$), it was found to be about 178 mV during sodium cycling, and about 106 mV during potassium cycling. The ohmic behavior of the voltage hysteresis resulted from the flooded cell geometry; most of the impedance in the cell was electrolyte resistance. The difference between the voltage hystereses during cycling of sodium and potassium arose from variations in cell geometry. The use of a thinner pressed cell geometry can result in even lower voltage hysteresis.

The low voltage hysteresis of NiHCF allows higher energy efficiency than that of conventional battery electrodes. Round-trip energy efficiency also depends on coulombic efficiency, and the coulombic efficiency of NiHCF was found to be between about 99.7% and about 99.9% during cycling for some embodiments. Thus, the low voltage hysteresis of NiHCF has a predominant effect on its energy efficiency.

In a hypothetical cell of nominal voltage of 1.0 V that contains NiHCF and a perfectly reversible counter electrode, the round-trip energy efficiency is about 98-99% at a 0.83 C rate. At higher current densities, an energy efficiency of about 90% is attainable during potassium cycling at 41.7 C, and an efficiency of about 83% is attainable during sodium cycling at the same rate. The energy efficiency of full cells using NiHCF electrodes can be even higher using a pressed cell geometry, but the reported results already surpass conventional batteries: a typical efficiency for lead-acid and vanadium flow batteries is 75-80%, while, at very low current densities, lithium-ion batteries can achieve efficiencies above 90%.

NiHCF showed high stability during electrochemical cycling of sodium to full (100%) depth of discharge, with essentially zero capacity loss after 5,000 cycles at a 8.3 C rate (see FIG. 7d). In addition, NiHCF showed essentially no capacity loss during the cycling of potassium for 1,000 cycles, after which capacity was lost at a rate of about 1.75%/1,000 cycles. In contrast, lead-acid cells can last about 1,200 cycles upon shallow (50%) discharging, and current vanadium flow cells can last up to 5,000 cycles at 70% discharge. The stability of NiHCF during sodium cycling is even greater than that of CuHCF, which showed slow capacity fading, at a rate of about 0.5%/1,000 cycles at 100% discharge in a potassium electrolyte. However, in the previous study of CuHCF, electrodes were dried at a higher temperature (100° C. instead of 80° C.), which may have damaged the CuHCF framework structure to some extent.

Figure 8:
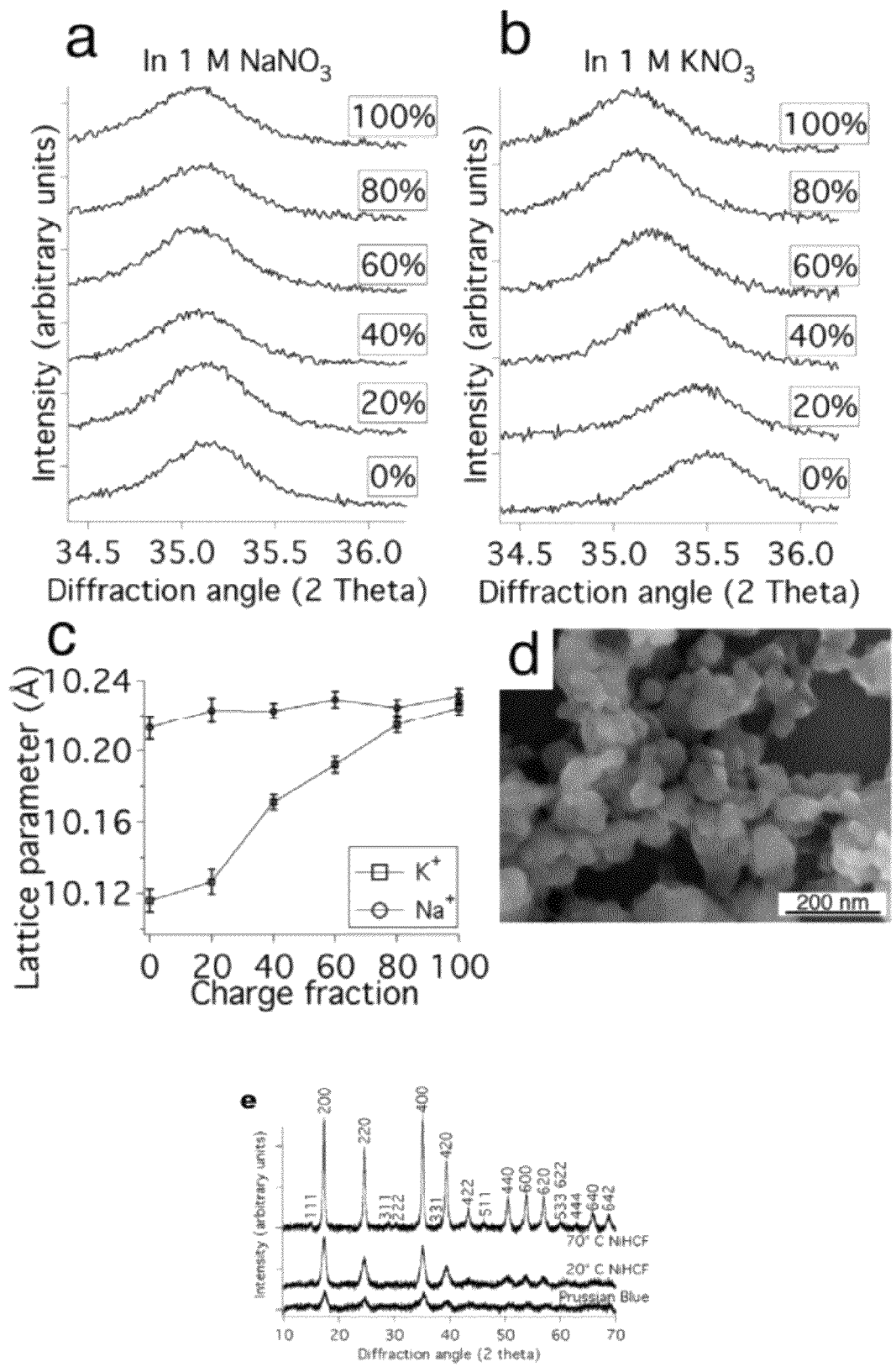
FIG. 8 illustrates the physical characterization of nickel hexacyanoferrate according to an embodiment of the invention. a-c: Ex-situ X-ray diffraction on nickel hexacyanoferrate at various charge states showed isotropic lattice strain during charging. Changes in the diffraction pattern are illustrated by the shift of the 400 diffraction peak (a, b) to lower angles with increasing charge state. c: The lattice parameter increases linearly with charge state, with total strains of about 0.18% and about 1.1% during $Na^+$ and $K^+$ insertion, respectively. The lattice parameters at each charge state are the averages of those calculated from the positions of six diffraction peaks for each sample. The error bars are one standard deviation from each sample's mean calculated lattice parameter. d: Scanning electron microscope image reveals that the as-synthesized nickel hexacyanoferrate powder is composed of a porous network of 20-50 nm grains. e: Powder X-ray diffraction shows that synthesis of nickel hexacyanoferrate at 70° C. produces higher crystallinity than synthesis at room temperature, while co-precipitation synthesis of Prussian Blue results in poor crystallinity.

The NiHCF material is composed of polydisperse nanoparticles of about 20-50 nm in diameter (see FIG. 8d). These form porous structures with a high surface area, allowing for rapid reaction with insertion ions. Physical characterization using scanning electron microscopy ("SEM") and XRD revealed that the nanostructured morphology has a high degree of crystallinity. The as-synthesized NiHCF powder was found to have a XRD spectrum corresponding to a phase-pure face-centered cubic structure with a lattice parameter of about 10.2 Å (see FIG. 8e). The rigid open framework of the Prussian Blue structure provides structural and chemical stability, allowing for repeated cycling of NiHCF with sodium and potassium with essentially no loss in capacity. Ex-situ XRD measurements were carried out by cycling NiHCF electrodes ten times at 250 mA/g, ending at full discharge. The electrodes were then charged to the desired fractional charge state at the same current density. The duration of the final charging current was determined from the specific capacity of each electrode observed during the initial ten cycles. XRD was then performed on the electrodes, and the positions of diffraction peaks were determined using Gaussian fits. Ex-situ XRD spectra of NiHCF electrodes at different charge states revealed that the lattice parameter increases linearly with charge state, as illustrated by a shift in the position of the 400 diffraction peak to smaller angles (see FIGS. 8a & b). The isotropic lattice strain is about 1.1% during potassium cycling, and about 0.18% during sodium cycling, which correlates with the better cycle life during sodium ion cycling (see FIG. 8c). The small increase in lattice parameter during charging also is observed in CuHCF, and corresponds to an increase in the radius of the [Fe$^{2+}$(CN)$_6$]$^{-4}$ group during its oxidation to [Fe$^{3+}$(CN)$_6$]$^{-3}$. The radius of the channel between the "A" sites in the Prussian Blue structure is comparable to the Stokes ionic radius of hydrated potassium, but smaller than the Stokes ionic radius of hydrated sodium. The possibility that potassium and sodium in the electrolyte might exchange with zeolitic water already present in the crystal structure may contribute to the mechanism for ion transport through the lattice. The reported lattice parameters (see FIG. 8c) are the means of the values calculated from the positions of six diffraction peaks for each sample. The error bars in this figure are one standard deviation from the mean calculated lattice parameter.

The NiHCF material can be synthesized in bulk using spontaneous chemical precipitation reactions from aqueous precursors at low temperatures. The synthesis is therefore both scalable and inexpensive. In addition, Prussian Blue analogues such as NiHCF operate in safe, inexpensive aqueous electrolytes, and possess superior rate capability, round-trip energy efficiency, and cycle life. Together, these properties make them desirable for a variety of energy storage systems, including the support of the large scale electric grid, especially against short-term transients.

Example 3

Copper Hexacyanoferrate and Nickel Hexacyanoferrate

This example describes additional measurements on CuHCF and NiHCF of some embodiments. To examine the effect of insertion species on the electrochemical properties of bulk CuHCF and NiHCF, these materials were cycled in aqueous electrolytes including lithium, sodium, potassium, or ammonium ions.

Syntheses of CuHCF and NiHCF nanopowder were performed using a co-precipitation method. Simultaneous, dropwise addition of about 40 mM copper or nickel nitrate, and about 20 mM potassium ferricyanide into deionized water allowed for controlled co-precipitation of solid CuHCF or NiHCF products. The synthesis of CuHCF was performed at room temperature, while the synthesis of NiHCF was performed at about 70° C. These solid products were filtered, washed with water, and dried in vacuum at room temperature. Up to about 3 g of product was produced during each synthesis, and these syntheses can be readily scaled to produce larger quantities of CuHCF and NiHCF. Slurries containing the as-synthesized hexacyanoferrates, amorphous carbon (Timcal SuperP Li), polyvinylidene difluoride (Kynar HSV 900), and graphite (Timcal KS6) in a ratio of 80:9:9:2 were prepared in 1-methyl-2-pyrrolidinone. These slurries were deposited on carbon cloth, and dried in vacuum at no more than about 80° C. The resulting CuHCF and NiHCF electrodes were about 100 μm thick, with a mass loading of about 5-10 mg/cm².

Three-electrode flooded cells including a CuHCF or NiHCF working electrode, a Ag/AgCl reference electrode, and a large, partially charged CuHCF or NiHCF counter electrode were used to study the electrochemical behavior of CuHCF and NiHCF in various aqueous electrolytes. The electrolytes used were aqueous 1 M $LiNO_3$, 1 M $NaNO_3$, 1 M $KNO_3$, and 0.5 M $(NH_4)_2SO_4$. The pH of all electrolytes was lowered to about 2 by the addition of nitric or sulfuric acid. The counter electrodes functioned as reversible ion sinks, analogous to the large mass of metallic lithium used for lithium ion half-cells. Both CuHCF and NiHCF initially include some potassium. To avoid contamination of the lithium, sodium, and ammonium electrolytes by potassium de-intercalated from the counter electrodes, the counter electrodes were pretreated. First, potassium was removed by fixing their potentials at 1.1 V vs. S.H.E. until the current decayed to zero. After washing with water, the counter electrodes were then partially discharged in fresh electrolyte by fixing their potentials at the half-charge potentials of CuHCF and NiHCF in each electrolyte. Each working and counter electrode pair was used in one type of electrolyte.

CuHCF and NiHCF were characterized by powder XRD and SEM. The materials were found to be phase pure, with the face-centered cubic Prussian Blue-type crystal structure. The lattice parameter of the as-synthesized CuHCF was about 10.16 Å, while the lattice parameter of the NiHCF powder was about 10.22 Å. TEM images revealed that both materials were composed of large, porous agglomerations of 20-50 nm nanoparticles. The small particle size and porous nature of the agglomerations are advantageous for battery electrodes, as the high surface-to-volume ratio of nanoparticles allows insertion ions to rapidly diffuse throughout the material.

To characterize the electrochemical behavior of CuHCF and NiHCF, galvanostatic cycling of these materials was performed in aqueous electrolytes containing $Li^+$, $Na^+$, $K^+$, or $NH_4^+$. Though other electrochemical techniques such as cyclic voltammetry also can be used to examine the electrochemical properties of electrodes, galvanostatic cycling is attractive because it imitates the steady-state conditions under which batteries often operate. The cycling was performed at current densities between about ±10 and about ±2500 mA/g of active material.

Specific capacities of about 60 mAh/g were observed for NiHCF and CuHCF during slow cycling in electrolytes containing $Li^+$, $Na^+$, $K^+$, and $NH_4^+$. For comparison, common lithium-ion battery cathodes such as $LiCoO_2$ and $LiFePO_4$ have specific capacities of between 130 mAh/g and 170 mAh/g. Though the specific capacities of NiHCF and CuHCF of some embodiments are lower, their inexpensive synthesis, high rate capability, and long cycle life suit them well for stationary applications, such as energy storage for the grid. For this example, 60 mAh/g is defined as 1 C. Thus, 50 mA/g is 0.83 C, and 2,500 mAh/g is 41.7 C.

Figure 11:
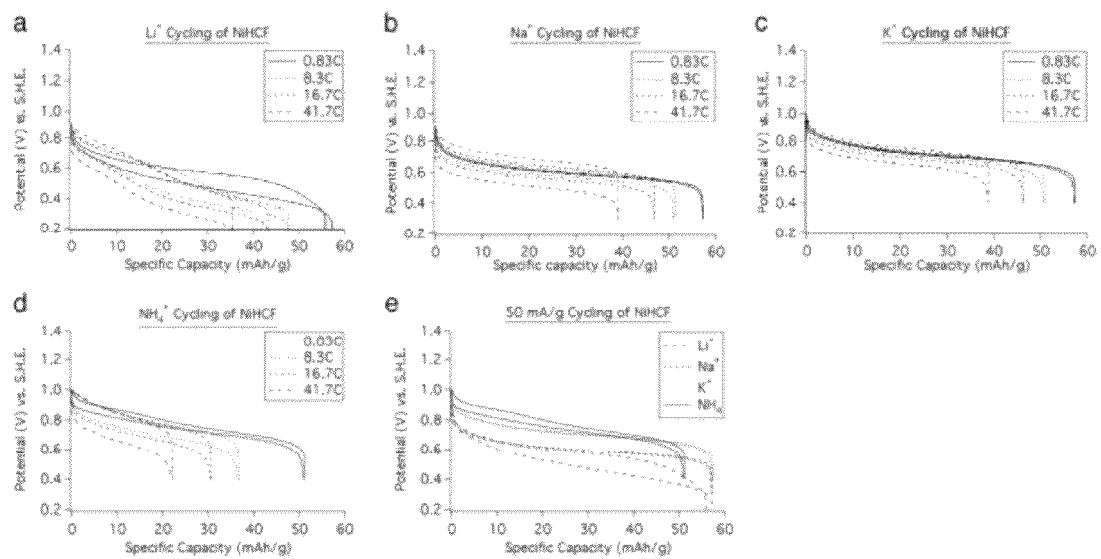
FIG. 11 illustrates the electrochemical performance of nickel hexacyanoferrate according to an embodiment of the invention. a-d: These plots show potential profiles of nickel hexacyanoferrate during galvanostatic cycling of $Li^+$, $Na^+$, $K^+$, and $NH_4^+$, respectively, at several current densities. e: This plot shows potential profiles of nickel hexacyanoferrate during galvanostatic cycling of $Li^+$, $Na^+$, $K^+$, and $NH_4^+$ at 50 mA/g (0.83 C).

The potential of NiHCF during insertion and extraction of both $Na^+$ and $K^+$ follows a smooth S-curve, indicative of a solid solution reaction. However, during the intercalation of $Li^+$ and $NH_4^+$ into NiHCF, the behavior is more complex. The removal of $Li^+$ from NiHCF begins at about 0.4 V vs. S.H.E., and, although a single plateau is observed during charging at a 0.83 C rate, the charging curve shows a change in slope at a charge state of about one third at higher current densities (see FIG. 11a). Without wishing to be bound by a particular theory, the more complicated insertion behavior of $Li^+$ into NiHCF may suggest destabilization of its open framework structure in some embodiments, as dissolved $Fe^{III}(CN)_6^{-3}$ was visually observed in the electrolyte after a few cycles. The reduction of dissolved $Fe^{III}(CN)_6^{-3}$ to $Fe^{II}(CN)_6^{-2}$ also resulted in a high discharge capacity during 0.83 C cycling of $Li^+$ with NiHCF. The reaction of NiHCF with $NH_4^+$ also shows complex behavior, as a shoulder and second plateau is observed near 0.85 V (see FIG. 11d). The reaction potential of NiHCF was found to increase for the heavier alkali ions, and its highest reaction potential was observed during the cycling of $NH_4^+$ (see FIG. 11e).

Figure 12:
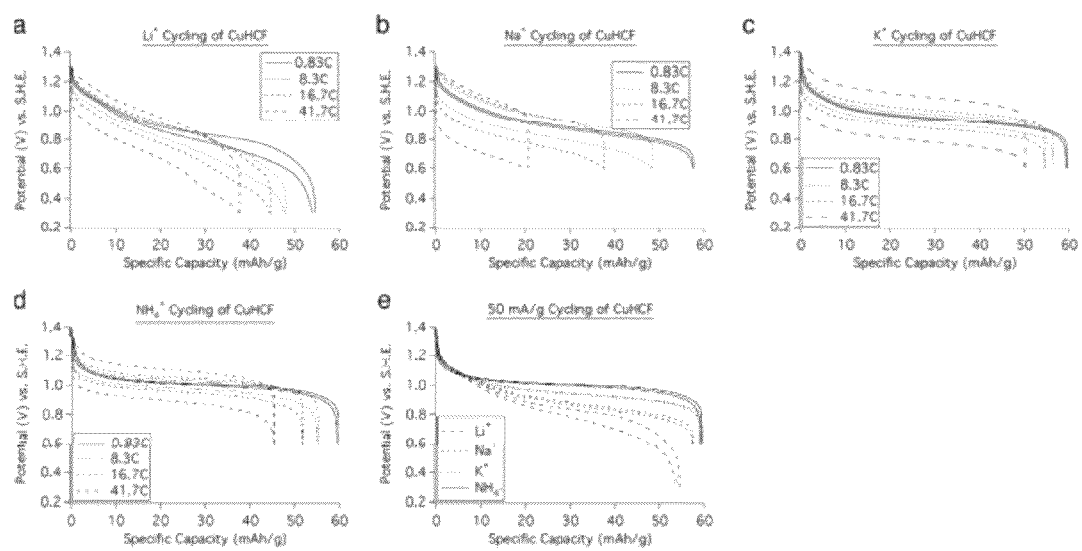
FIG. 12 illustrates the electrochemical performance of copper hexacyanoferrate according to an embodiment of the invention. a-d: These plots show potential profiles of copper hexacyanoferrate during galvanostatic cycling of $Li^+$, $Na^+$, $K^+$, and $NH_4^+$, respectively, at several current densities. e: This plot shows potential profiles of copper hexacyanoferrate during galvanostatic cycling of $Li^+$, $Na^+$, $K^+$, and $NH_4^+$ at 50 mA/g (0.83 C).

The electrochemical properties of CuHCF also vary with insertion ion. During its reaction with $Li^+$ (see FIG. 12a), a slight shoulder is observed near a charge state of one third, just as was observed during the cycling of NiHCF with $Li^+$. However, the cycling of CuHCF with $Na^+$, $K^+$, and $NH_4^+$ appears to be relatively straightforward, as a single reaction plateau is observed during each of these reactions (see FIGS.

12b-d). As was observed for NiHCF, the reaction potential of CuHCF increases for heavier alkali ions, with an even higher and flatter reaction potential for $NH_4^+$ (see FIG. 12e).

The intercalation of $Li^+$ into both NiHCF and CuHCF occurs over a broader potential window than the insertions of the other ions, even at low current densities. NiHCF reacts with $Li^+$ over a window of about 0.5 V, and the reaction of CuHCF with $Li^+$ occurs over a range of about 0.7 V. The reactions of the other insertion ions with NiHCF and CuHCF occur more sharply. At a 0.83 C rate, the full capacity of NiHCF during the cycling of $Na^+$ and $K^+$ can be achieved in a span of about 0.3 V, while its reaction with $NH_4^+$ occurs over a window of about 0.4 V. In CuHCF at the same rate, voltage ranges of about 0.4 V, about 0.3 V, and about 0.2 V are involved for the cycling of $Na^+$, $K^+$, and $NH_4^+$, respectively.

Figure 13:
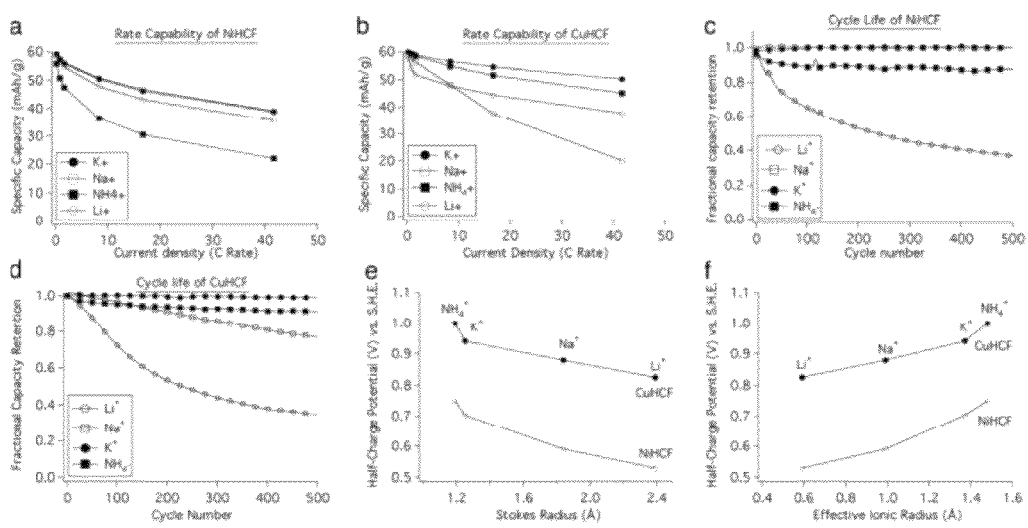
FIG. 13 illustrates rate capability, cycle life, and effect of insertion ion size on nickel hexacyanoferrate and copper hexacyanoferrate according to an embodiment of the invention. a, b: These plots show capacity retention of nickel hexacyanoferrate and copper hexacyanoferrate with increasing current densities. c, d: These plots show cycle life of nickel hexacyanoferrate and copper hexacyanoferrate during cycling of $Li^+$, $Na^+$, $K^+$, and $NH_4^+$. e: This plot shows that reaction potentials of nickel hexacyanoferrate and copper hexacyanoferrate decrease with increasing Stokes radius of the insertion ion. f: This plot shows that reaction potentials of nickel hexacyanoferrate and copper hexacyanoferrate increase with the effective ionic radius of the insertion ion.

Both NiHCF and CuHCF have high rate capability, retaining most of their capacities even at high current densities. This can be attributed, at least in part, to the porous, nanoparticulate electrode morphology, and to the open framework crystal structure of these materials, each of which allows rapid ion transport through the electrodes. During the de-intercalation of both $Na^+$ and $K^+$, NiHCF retains about 86% of its discharge capacity when cycled at 8.3 C, and about 66% of its discharge capacity at 2,500 mA/g, namely when cycled at a 41.7 C rate (see FIG. 13a). These results compare favorably with the capacity retention of lithium-ion battery electrodes such as $LiFePO_4$, as well as the sodium-ion electrode $Na_4Mn_9O_{18}$. The high similarities between both the shapes of the potential profiles and the capacity retentions at high rates suggest that the intercalation of $Na^+$ and $K^+$ into NiHCF proceeds by similar mechanisms. During the cycling of $Li^+$ and $NH_4^+$, NiHCF retains about 58% and about 39%, respectively, of the discharge capacities when cycled at a 41.7 C rate. The rate capability of CuHCF during $K^+$ cycling is even higher than that of NiHCF, with about 94.7% capacity retention at 8.3 C, and retaining about 84% of its capacity at 41.7 C (see FIG. 13b). Insertion of $NH_4^+$ and $Li^+$ into CuHCF also occurs readily at high rates, as it retains about 75% and about 65% of its discharge capacity during these respective reactions, at 41.7 C. In contrast to NiHCF, CuHCF of some embodiments shows a less impressive rate capability during reaction with $Na^+$, during which it retains about 34% of its capacity at 41.7 C.

NiHCF and CuHCF both show high rate capability during the insertion of $K^+$ and $NH_4^+$, but behave differently when cycling $Na^+$ and $Li^+$. Lithium ions can be easily cycled in CuHCF at high rates, while cycling of $Na^+$ yields less impressive performance in some embodiments; the converse is observed for NiHCF. XRD indicates that these two materials had lattice parameters that differed by less than about 1%, and so the "A" sites and the channels between those sites should be closely similar in size for the two materials. Without wishing to be bound by a particular theory, it is possible that the difference in the ease of $Na^+$ and $Li^+$ insertion in CuHCF and NiHCF results from some other differences in their framework structures.

The use of aqueous electrolytes and scalable, low-temperature syntheses allow batteries based on NiHCF and CuHCF to be manufactured in an inexpensive fashion. Yet, for inexpensive operation, these materials also should be durable. Extended cycling of NiHCF and CuHCF at a 8.3 C rate (500 mA/g) was performed in $Li^+$, $Na^+$, $K^+$, and $NH_4^+$ electrolytes. NiHCF shows essentially zero capacity loss for 500 cycles during the cycling of $Na^+$ and $K^+$ (see FIG. 13c). After an initial capacity loss of about 10% during the first 100 cycles, NiHCF is stable during the cycling of $NH_4^+$, retaining about 88% of its initial capacity after 500 cycles. However, NiHCF of some embodiments shows greater capacity loss when $Li^+$ is cycled. Without wishing to be bound by a particular theory, this may be attributed to the dissolution of NiHCF during $Li^+$ cycling.

CuHCF also shows excellent durability during long cycling at the same rate. CuHCF retains about 99% of its initial capacity after 500 cycles of $K^+$ insertion (see FIG. 13d). The capacity retention of CuHCF during its reaction with other ionic species is lower for some embodiments. CuHCF retains about 91%, about 77%, and about 35% of its initial capacity after 500 cycles for $NH_4^+$, $Na^+$, and $Li^+$, respectively. The greater capacity loss of CuHCF during its cycling with $Li^+$ is similar to the behavior of NiHCF during $Li^+$ cycling.

In this example, the counter electrodes included large masses of the same hexacyanoferrate active materials as the working electrodes. In such fashion, the counter electrodes acted as reversible ion sinks with small changes in their potentials, and served to inhibit spurious side reactions such as electrolyte decomposition. However, the presence of large masses of CuHCF and NiHCF in the counter electrodes may mask the effects of trace solubility of these materials in aqueous electrolytes. While visual observation was made of dissolved $Fe(CN)_6^{-3}$ during the insertion of $Li^+$ into CuHCF and NiHCF, slower dissolution may also explain the smaller capacity losses observed during the cycling of $NH_4^+$ for both materials, and during the cycling of $Na^+$ in CuHCF. Further optimizations can establish conditions under which CuHCF and NiHCF can be operated with long cycle life in full cells that do not include excess ferricyanide in counter electrodes.

It might have been expected that insertion species with Stokes ionic radii smaller than the radius of the channels between the "A" sites can be readily cycled, while larger sized species could not be readily cycled. Demonstration of $Na^+$ cycling in NiHCF indicates that this proposition is not generally true: the Stokes ionic radius of aqueous $Na^+$ is about 1.8 Å, while the radius of the channels connecting the "A" sites is about 1.6 Å. The reaction potential of both NiHCF and CuHCF decreases with an increase in the Stokes ionic radius of the insertion ion (see FIG. 13e). The higher the charge-to-radius ratio of an ion, the more strongly water molecules will typically coordinate to it, and so a larger Stokes ionic radius in aqueous solution typically correlates with a smaller effective ionic radius. Thus, for both NiHCF and CuHCF, higher potentials are observed during reactions with larger ions (see FIG. 13f) on the basis of the Shannon effective ionic radii (see Shannon, R. D., "Revised Effective Ionic Radii and Systematic Studies of Interatomic Distances in Halides and Chalcogenides," *Acta Cryst.*, A32, 751 (1976), the disclosure of which is incorporated herein by reference in its entirety).

Example 4

Electrochemical Performance of Full Cells

Figure 14:
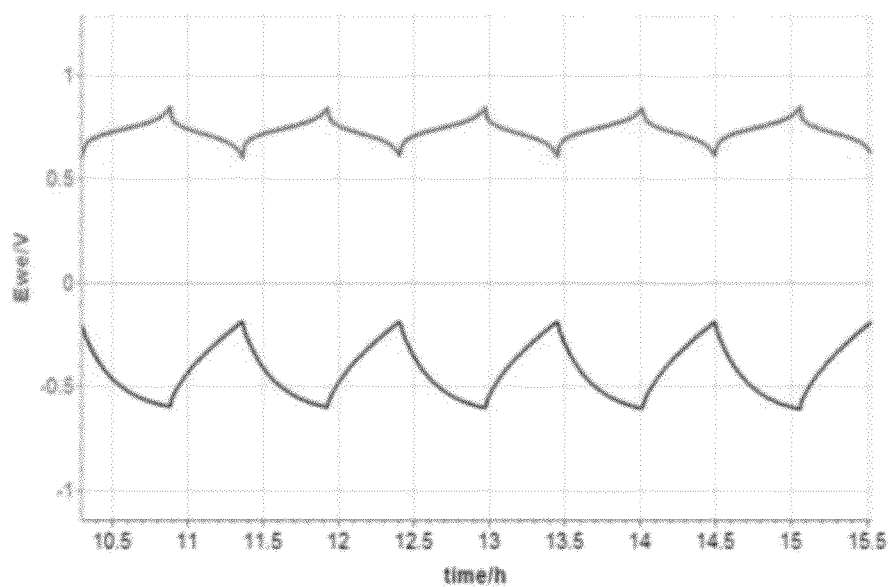
FIG. 14 illustrates potential profiles of a copper hexacyanoferrate cathode and an activated carbon/polypyrrole anode during cycling at a 5 C rate in a pH=1 aqueous potassium ion electrolyte, according to an embodiment of the invention.

This example describes the use of Prussian Blue analogue electrodes in full cells. A device was assembled so as to include a CuHCF cathode, a non-Prussian Blue analogue anode, namely a mixed activated carbon ("AC")/polypyrrole ("PPy") anode, and an aqueous electrolyte including potassium ions at a pH of about 1. The potential profiles of the CuHCF cathode and the AC/PPy anode during cycling in the aqueous potassium ion electrolyte are illustrated in FIG. 14. As can be appreciated, the potential profiles are substantially unchanged for several cycles. Without wishing to be bound by a particular theory, the combination of the electrolyte with a pH of about 1 and the use of the highly reversible, high capacity AC/PPy anode allows the CuHCF cathode to operate reversibly with essentially no chemical instability. Full cells of this type can be implemented with essentially zero capacity loss after 500 cycles.

Figure 15:
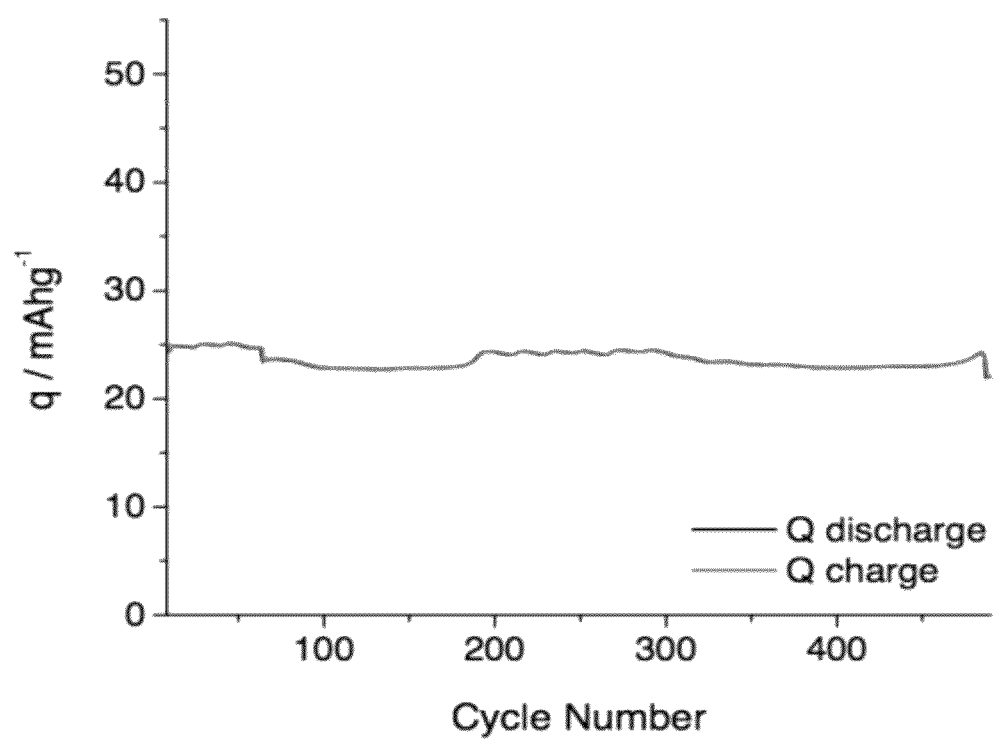
FIG. 15 illustrates capacity retention of a device including a copper iron hexacyanoferrate cathode, an activated carbon anode, and an aqueous electrolyte including sodium ions at a 5 C rate and pH=1, according to an embodiment of the invention.

Another device was assembled so as to include a copper iron hexacyanoferrate cathode ("CuFeHCF") (i.e., a combination of elements (copper and iron) at the "P" sites of the crystal structure), a non-Prussian Blue analogue anode, namely an AC anode, and an aqueous electrolyte including sodium ions at a pH of about 1. As can be appreciated from FIG. 15, there is essentially no capacity loss after 500 charge/discharge cycles of this device. The potential profile of this device during charge/discharge is similar to that of the device including the CuHCF cathode//AC/PPy anode in the potassium ion electrolyte.

Example 5

Cycling of Divalent Insertion Ions

Figure 16:
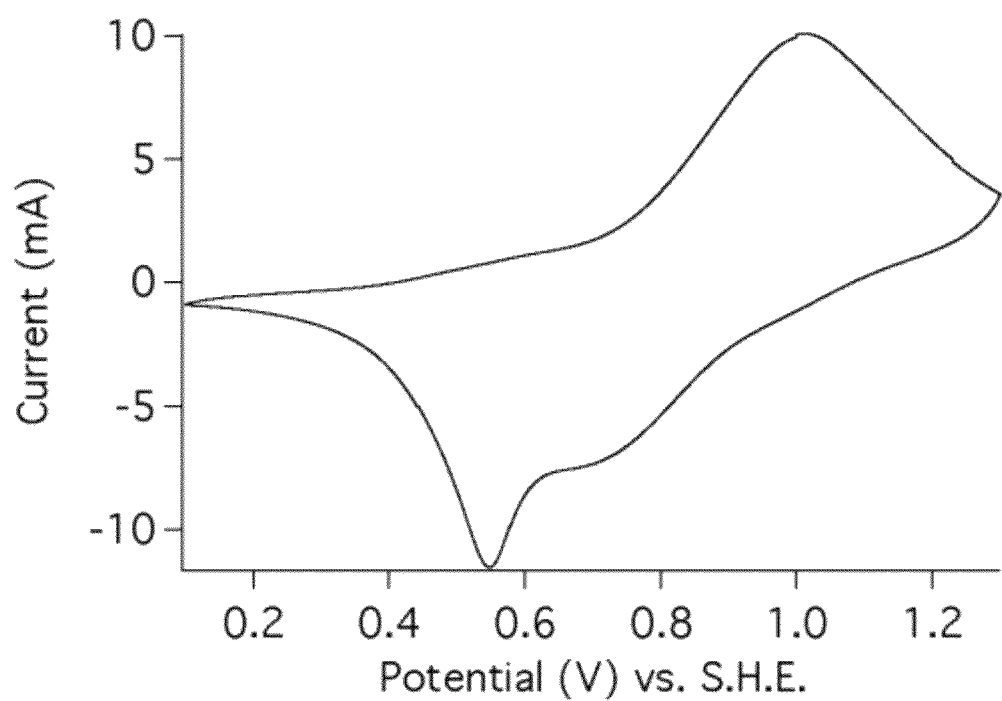
FIG. 16 illustrates results of cyclic voltammetry performed on a copper hexacyanoferrate electrode in an aqueous electrolyte containing $Mg(NO_3)_2$ at pH=1, according to an embodiment of the invention.

To demonstrate the reversible cycling of a Prussian Blue analogue with a divalent insertion ion, cyclic voltammetry was performed on a CuHCF electrode in an aqueous electrolyte including $Mg(NO_3)_2$ at a pH of about 1. As illustrated in FIG. 16, the electrode showed reversible electrochemical oxidation/reduction when its potential was swept over a wide range. The plot illustrates a representative charge/discharge cycle, and this behavior was observed to be reversible. It might have been expected that insertion species with Stokes ionic radii larger than the radius of the channels between the "A" sites cannot be readily cycled. Demonstration of $Mg^{+2}$ cycling in CuHCF indicates that this proposition is not generally true: the Stokes ionic radius of aqueous $Mg^{+2}$ is about 5 Å, while the radius of the channels connecting the "A" sites is about 1.6 Å.

Example 6

Copper Nickel Hexacyanoferrate

Figure 17:
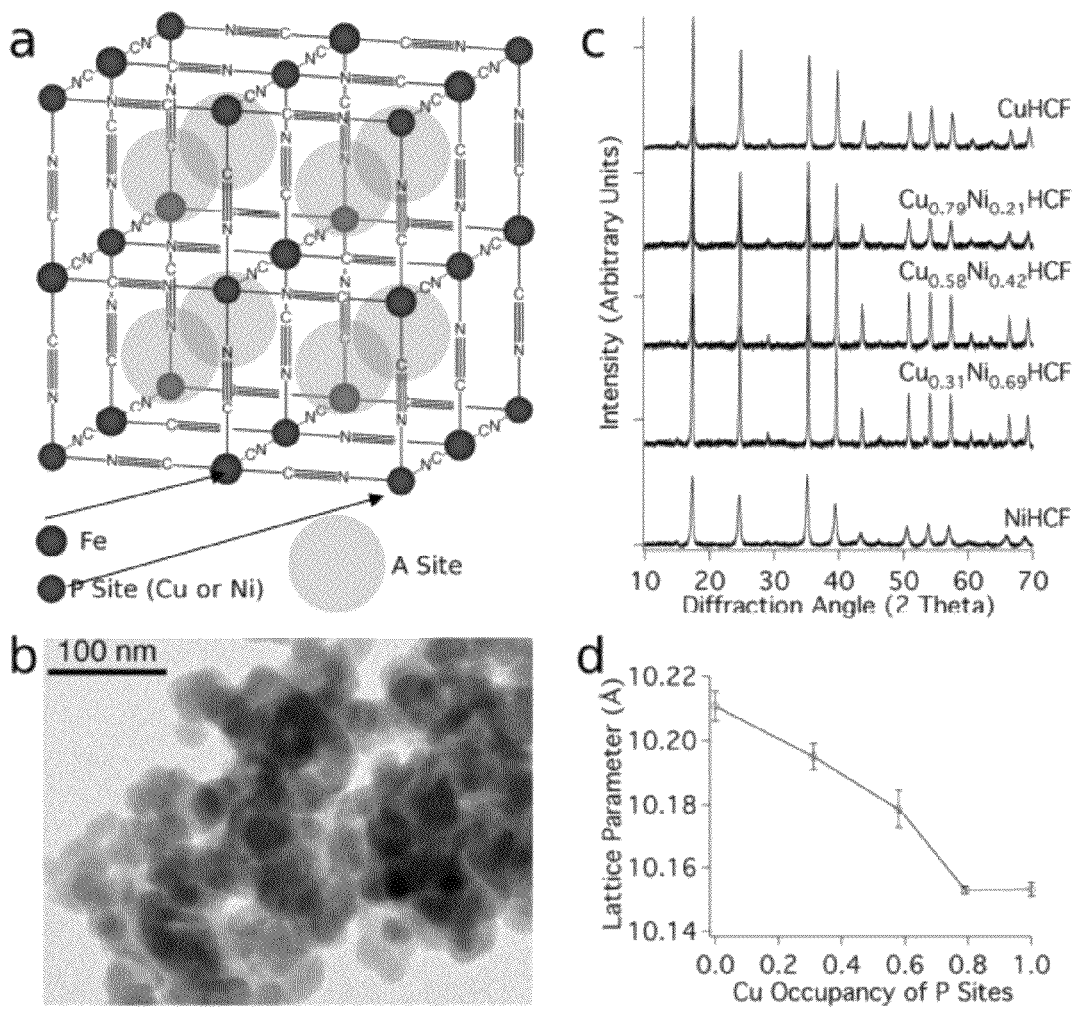
FIG. 17 illustrates the physical characterization of copper nickel hexacyanoferrate, according to an embodiment of the invention. a: The unit cell of copper nickel hexacyanoferrate includes a framework of hexacyanoferrate groups linked by nitrogen coordinated "P" site transition metal ions of Cu and Ni. The large interstitial "A" sites can include either hydrated ions or zeolitic water. b: Transmission electron microscope image reveals that copper nickel hexacyanoferrate is composed of agglomerations of 20-50 nm particles. c: X-ray diffraction of copper nickel hexacyanoferrate powders reveals that the materials are highly crystalline, have a face-centered cubic Prussian Blue structure, and contain no impurity phases. d: The lattice parameter of copper nickel hexacyanoferrate decreases with decreasing Ni content.

This example describes copper nickel hexacyanoferrate ("CuNiHCF"), which includes a combination of elements (copper and nickel) at the "P" sites of the Prussian Blue crystal structure (see FIG. 17a).

CuNiHCF was synthesized following a similar co-precipitation method as described in previous examples. Briefly, one aqueous precursor solution including $Cu(NO_3)_2$ and $Ni(NO_3)_2$ and another aqueous precursor solution of $K_3Fe(CN)_6$ were combined in pure water by simultaneous dropwise addition. Solid products of the formula $K_xCu_{1-p'}Ni_{p'}[Fe(CN)_6]_z$ (0≤p'≤1) rapidly precipitated. These products were filtered, washed with water, and dried in vacuum at room temperature. The relative amounts of Cu, Ni, and Fe in the products were measured using inductively coupled plasma mass spectrometry.

TEM characterization of CuNiHCF showed that these materials are composed of agglomerations of 20-50 nm nanoparticles (FIG. 17b). XRD characterization revealed that these materials are phase-pure and highly crystalline (FIG. 17c). The lattice parameter of CuNiHCF generally increases with nickel content (see FIG. 17d).

Figure 18:
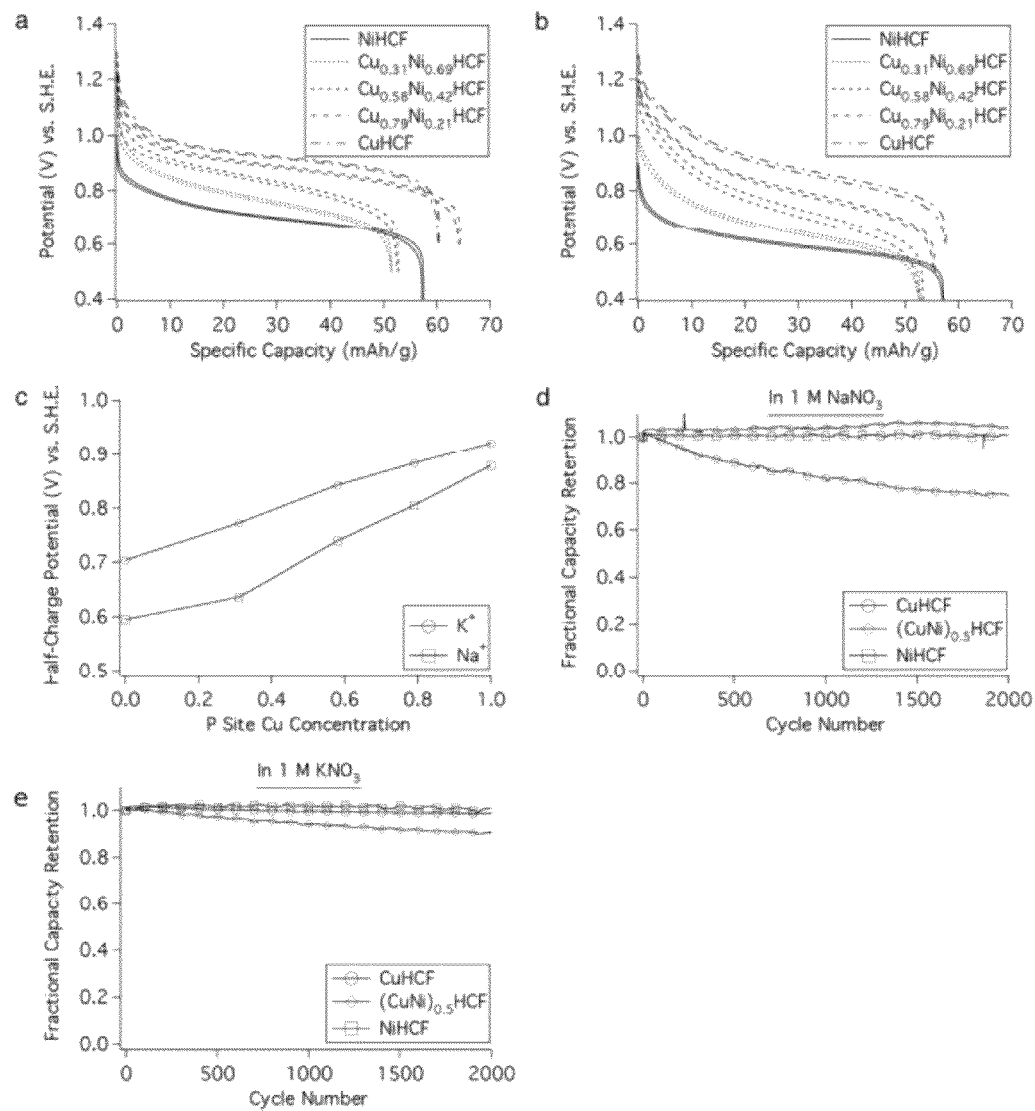
FIG. 18 illustrates the electrochemical characterization of copper nickel hexacyanoferrate, according to an embodiment of the invention. a: These plots show potential profiles of copper nickel hexacyanoferrate during galvanostatic cycling in 1 M $NaNO_3$. b: These plots show potential profiles of copper nickel hexacyanoferrate during galvanostatic cycling in 1 M $KNO_3$. c: The reaction potential of copper nickel hexacyanoferrate increases with Cu content, in both sodium and potassium electrolytes. d: Nickel hexacyanoferrate and $Cu_{0.58}Ni_{0.42}HCF$ show essentially no capacity loss after 2,000 cycles in 1 M $NaNO_3$, while copper hexacyanoferrate loses about 25% of its initial capacity. e: Copper hexacyanoferrate and nickel hexacyanoferrate show essentially no capacity loss after 2,000 cycles in 1 M $KNO_3$, while $Cu_{0.58}Ni_{0.42}HCF$ shows a capacity loss of about 10%.

Electrochemical characterization of the CuNiHCF materials was performed using aqueous half-cells. Working and counter electrodes were prepared as described in previous examples. Electrolytes used were 1 M $KNO_3$ or 1 M $NaNO_3$, with dilute $HNO_3$ added to achieve pH=2. Galvanostatic cycling was performed on CuNiHCF electrodes at 50 mA/g in potassium ion electrolyte (see FIG. 18a) and sodium ion electrolyte (see FIG. 18b). In both electrolytes, a reaction potential of the CuNiHCF materials was found to increase with copper content (see FIG. 18c). This result demonstrates that the reaction potential of Prussian Blue analogues can be controlled by changing relative amounts of species occupying the "P" sites. Materials of intermediate composition (including both Cu and Ni) showed a single reaction potential, so Cu and Ni are expected to be distributed randomly on the "P" sites, resulting in a substantially uniform, average electronic environment for electrochemically active hexacyanoferrate groups. The Cu/Ni occupancy of the "P" sites of the Prussian Blue crystal structure, therefore, can be described as a fully miscible solution of Cu and Ni. The electrochemical and XRD data is consistent with CuNiHCF as a single phase, regardless of its chemical composition within the tested range.

Long-term electrochemical cycling of CuHCF, NiHCF, and CuNiHCF (p'=0.42) was performed in both electrolytes. NiHCF and CuNiHCF showed essentially zero capacity loss after 2,000 cycles when cycled at 500 mA/g in 1 M $NaNO_3$, while CuHCF loses about one quarter of its initial capacity when cycled under these conditions (see FIG. 18d). In 1 M $KNO_3$, CuHCF and NiHCF showed essentially zero capacity loss after 2,000 cycles at 500 mA/g, while CuNiHCF showed a capacity loss of about 10% (see FIG. 18e). Without wishing to be bound by a particular theory, the mechanism for capacity loss may arise from slow dissolution of the Prussian Blue analogues.

Example 7

Electrochemical Performance of Full Cells

This example describes the use of Prussian Blue analogues in full, two-electrode cells including such materials in cathodes, and a different type of material in anodes. The choice of anodes is governed by conditions in which open framework structures operate: an acidic, water-based electrolyte (e.g., pH=1). One choice for anodes is a carbon-based material, namely AC. Full cell results using open framework structure cathodes and anodes including AC are described here. Experiments in full cells allowed the identification of cathode solubility issues hidden under other experimental conditions, and allowed the identification of ways to address the partial solubility of open framework structure materials. Solubility of battery electrodes can result in a loss of capacity, and can also result in electrochemical reactions that impede a battery from cycling properly.

The data presented in this example demonstrate the use of three Prussian Blue analogues for use as cathodes in full cells: CuHCF, NiHCF, and CuFeHCF. These are three examples of the Prussian Blue analogue class of materials, which includes other materials that also can be used as cathodes in full cell batteries. Furthermore, the data presented in this example demonstrate the operation of Prussian Blue analogue cathodes against two types of anodes: one including AC, and another including a mixture of AC and PPy, which is an electronically conductive polymer. The addition of electronically conductive polymers to AC provides improved properties in accordance with some embodiments. In brief, these conductive polymer additives can allow control of an operating potential of the AC, which can increase an overall voltage of full cells. In addition, these conductive polymer additives can be electrochemically active (as is the case for PPy), which can increase a specific capacity and an energy density of the AC/PPy electrode. Together, these results demonstrate the operation of a full cell including a Prussian Blue analogue electrode, another electrode based on a carbon-based material and an additive such as an electronically conductive polymer, and an electrolyte that is optimized to maintain the chemical and electrochemical stability and insolubility of both electrodes.

Experimental Procedures:

Both cathodes and anodes were prepared by drop-casting fine particle ink onto a carbon cloth ("CC") current collector. The CC is particularly resistant to potentially corrosive conditions of water-based electrolytes and allows high mass loadings. The open framework structure ink was prepared by mixing 85% wt./wt. of active material, 8% wt./wt. of carbon black, and 7% wt./wt. of polyvinylidene fluoride. The AC ink was composed of 90% wt./wt. active material and 10% wt./wt. of polyvinylidene fluoride. N-methyl pyrrolidone was used as a solvent (about 0.8 g for every 0.2 g of powder). The loading of active material was in the order of 10-15 mg cm$^{-2}$ for cathodes and 45-50 mg cm$^{-2}$ for anodes.

Electrochemical performance of the devices was evaluated using a flooded cell, three electrode setup using Ag|AgCl| 3.5M as a reference electrode. In some tested configurations, the electrolyte was based on a 1M $KH_2PO_4/H_3PO_4$ solution at pH=1. The choice of 1M $KH_2PO_4/H_3PO_4$ as an electrolyte was governed by three main considerations: (1) it is electrochemically stable in the potential range tested; (2) it is inexpensive; and (3) it is a good buffer system, with a pH around 2, and a stable pH facilitates uniform performance over a long period of time. The solution was purged with nitrogen for 15 minutes before each experiment.

Figure 19:
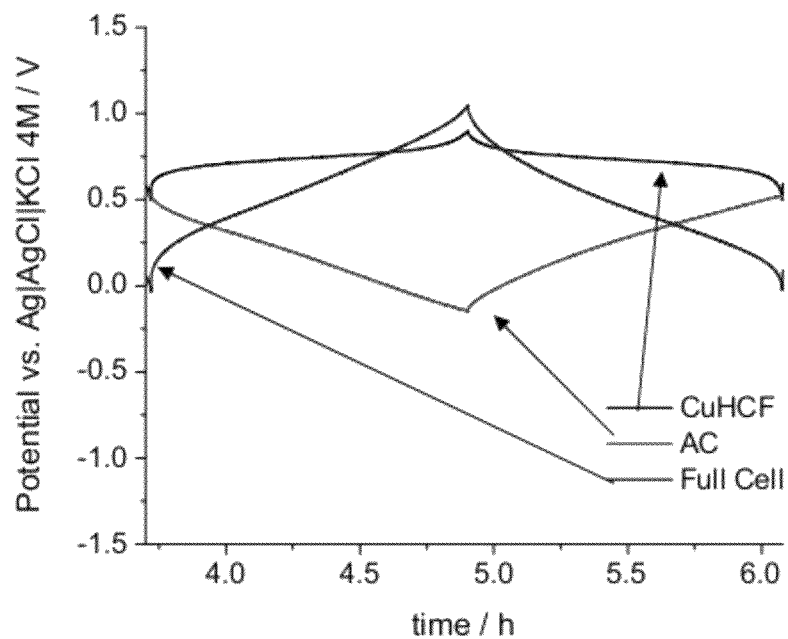
FIG. 19 illustrates the charge-discharge profile of a full cell at 2 C rate, 0.5 mA cm$^{-2}$, according to an embodiment of the invention. The full cell included a nickel hexacyanoferrate cathode and an activated carbon anode.

Results and Discussion:

FIG. 19 illustrates the galvanostatic cycling of an open framework structure/AC full cell battery. The potential profile of the negative electrode varies almost linearly with the state of charge, which is a typical behavior of an electrochemical double-layer capacitor (ultracapacitor) electrode. The open circuit potential of the AC varies between 0.4-0.8 V versus the reference electrode, depending on the presence of surface groups. The slope of the charge/discharge curve depends on the surface area of the AC exposed to the electrolyte (interface), and typically increases with AC loading. As a rule of thumb, a double layer capacitance in water-based electrolyte is about 25 µF cm$^{-2}$.

During initial trials with AC-based anodes, it was observed that the open framework structure cathodes show some solubility after long term cycling. This was evident by the observation that the electrolyte became colored, and a blue deposit appeared on the AC anode, due to local electrodeposition of Prussian Blue material.

Figure 20:
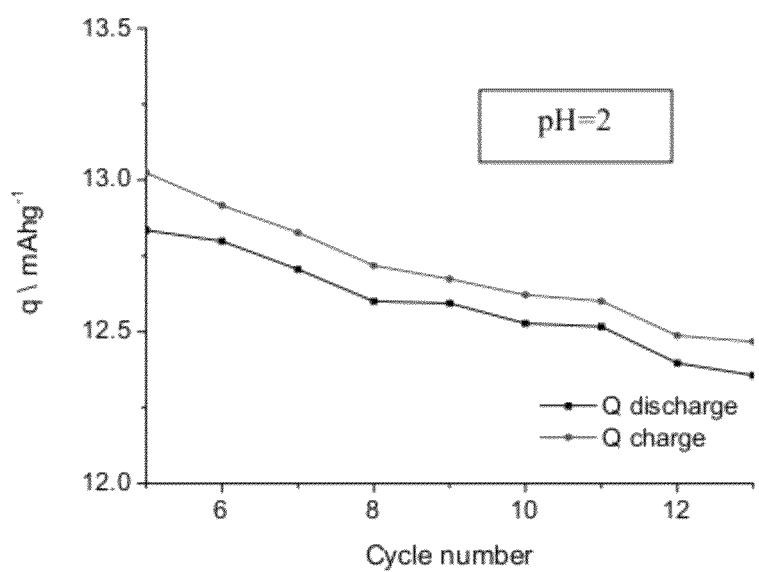
FIG. 20 illustrates capacity retention of a CuHCF/AC full cell in 1M $KH_2PO_4/H_3PO_4$ at a 2 C rate and pH=2, according to an embodiment of the invention.
Figure 21:
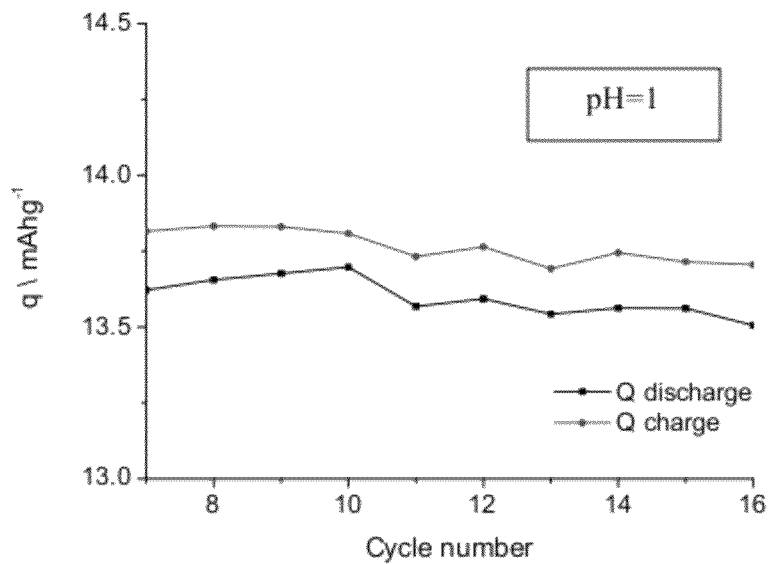
FIG. 21 illustrates capacity retention of a CuHCF/AC full cell in 1M $KH_2PO_4/H_3PO_4$ at a 2 C rate and pH=1, according to an embodiment of the invention.

To address the solubility issue, the pH-dependence of the solubility of both NiHCF and CuHCF was analyzed by placing 10 mg of each material in the electrolyte at different pH values and analyzing the solution by UV-vis spectroscopy. It was observed that the solubility increases with increasing pH of the solution in each case. After narrowing down a desirable pH range (to less than about 2) through the solubility analysis, the CuHCF material in a potassium-based electrolyte was used as a standard system for further optimization of the operating pH. As illustrated in FIG. 20 and FIG. 21, the long term (20 cycles, more or less 3 days) stability of the material is improved by decreasing the pH from 2 to 1. A further decrease of the pH (tested to pH=0) can result in some material instability due to decomposition and subsequent HCN evolution, according to some embodiments.

Figure 22:
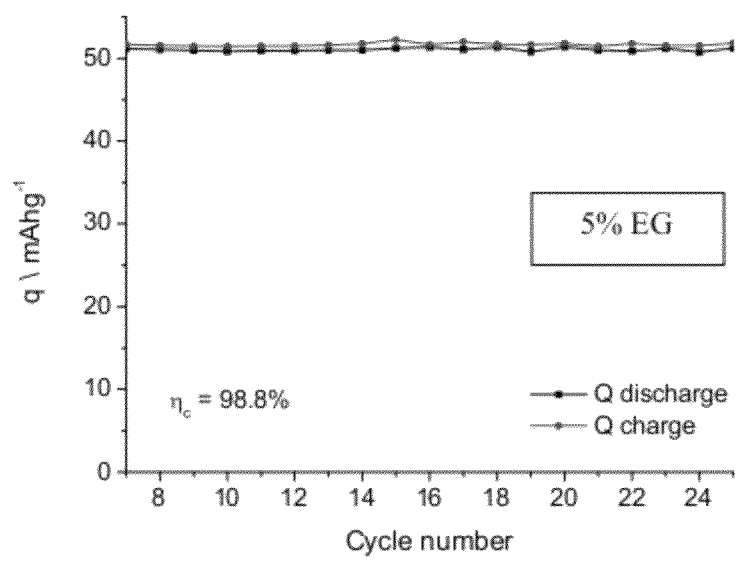
FIG. 22 illustrates capacity retention of a CuHCF/AC full cell in the presence of 5% ethylene glycol as a co-solvent a 2 C rate, according to an embodiment of the invention.
Figure 23:
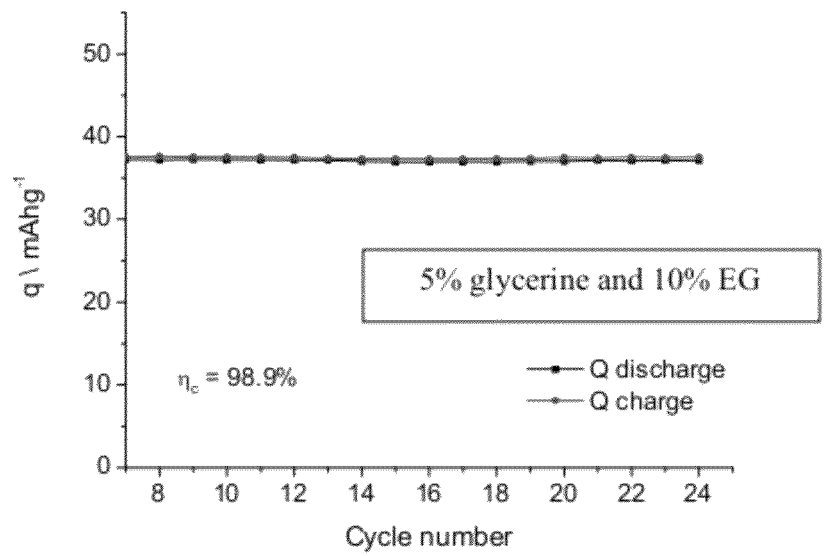
FIG. 23 illustrates capacity retention of a CuHCF/AC full cell in the presence of 10% ethylene glycol as a co-solvent a 2 C rate, according to an embodiment of the invention.
Figure 24:
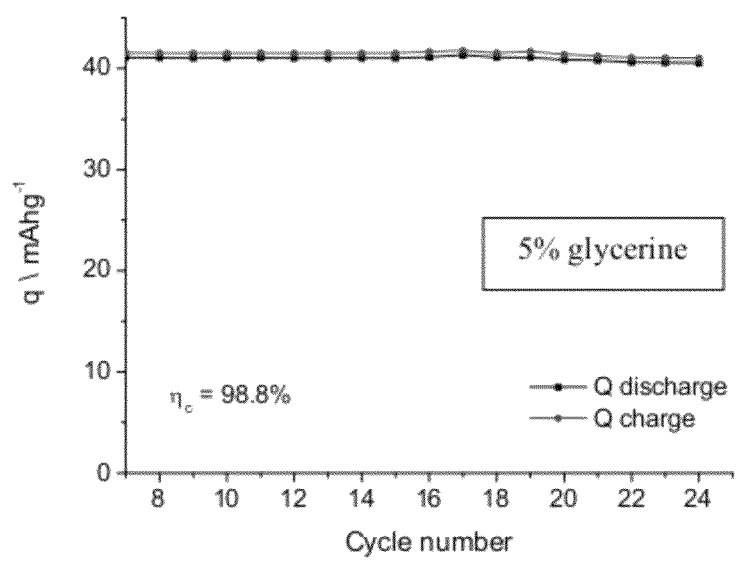
FIG. 24 illustrates capacity retention of a CuHCF/AC full cell in the presence of 5% glycerine as a co-solvent a 2 C rate, according to an embodiment of the invention.
Figure 25:
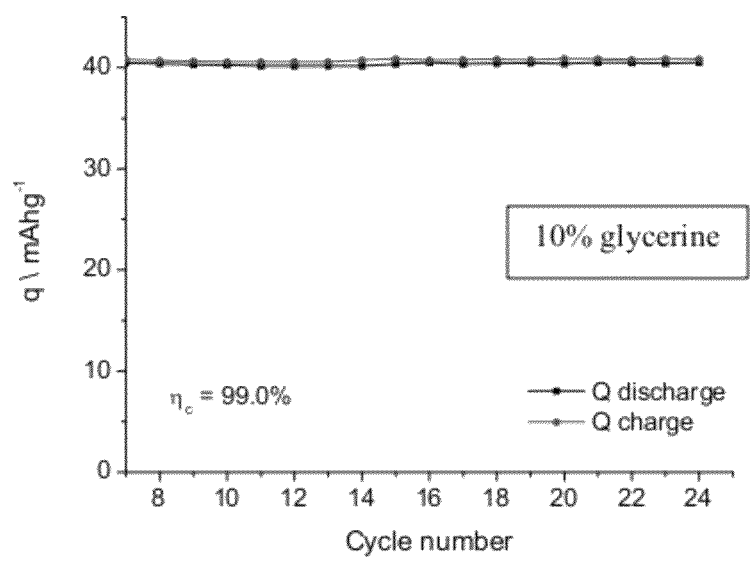
FIG. 25 illustrates capacity retention of a CuHCF/AC full cell in the presence of 10% glycerine as a co-solvent a 2 C rate, according to an embodiment of the invention.

The stability of open framework structure electrode materials was also analyzed in the presence of less polar co-solvents. The choice of the co-solvents was governed by three main considerations: (1) a co-solvent should be miscible with water; (2) a co-solvent should be stable in an operating potential range; and (3) the presence of a co-solvent should not interfere with the solubility of the 1M potassium salt. The inclusion of 5% and 10% glycerine and ethylene glycol ("EG") was investigated. In order to test the electrochemical stability of the co-solvents, cyclic voltammetry measurements were made on a glassy carbon pin electrode in the potential stability range of water at pH=1. No measurable electrochemical activity was found in either of the 5% solutions, while the 10% solutions showed a small oxidative current at high potentials. FIG. 22 illustrates the charge/discharge profile for a CuHCF/AC full cell in the presence of 5% EG, and FIG. 23 illustrates the charge/discharge profile for a CuHCF/AC full cell in the presence of both 5% glycerine and 10% EG. FIG. 24 illustrates the charge/discharge profile for a CuHCF/AC full cell in the presence of 5% glycerine, and FIG. 25 illustrates the charge/discharge profile for a CuHCF/ AC full cell in the presence of 10% glycerine. As can be appreciated, the devices exhibited excellent capacity retention in the presence of the co-solvents over the cycles tested. Without wishing to be bound by a particular theory, the presence of the co-solvents can decrease a solubility of Prussian Blue analogue electrodes in full cell devices.

Using operating conditions at pH=1, open framework structure materials were tested in full cells during long term cycling (500 cycles, 10 C, average of 80 h in electrolytes). Experiments were conducted in full cell setups with CuHCF, NiHCF, CuFeHCF in $K^+$, $Na^+$ and $NH_4^+$-based electrolytes. The results demonstrate the long term cyclability of the open framework structure materials against a carbon-based anode material.

Figure 26:
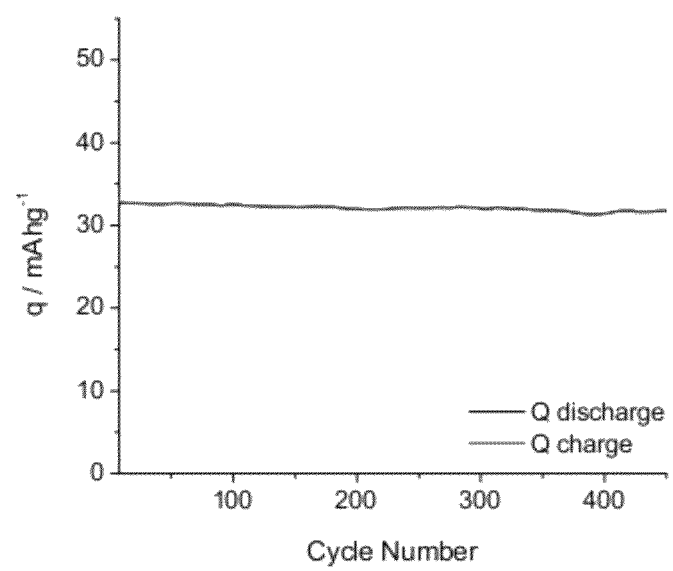
FIG. 26 illustrates long term cycling (500 cycles) of a NiHCF/AC full cell in 1 M $Na^+$ at pH=1, according to an embodiment of the invention.
Figure 27:
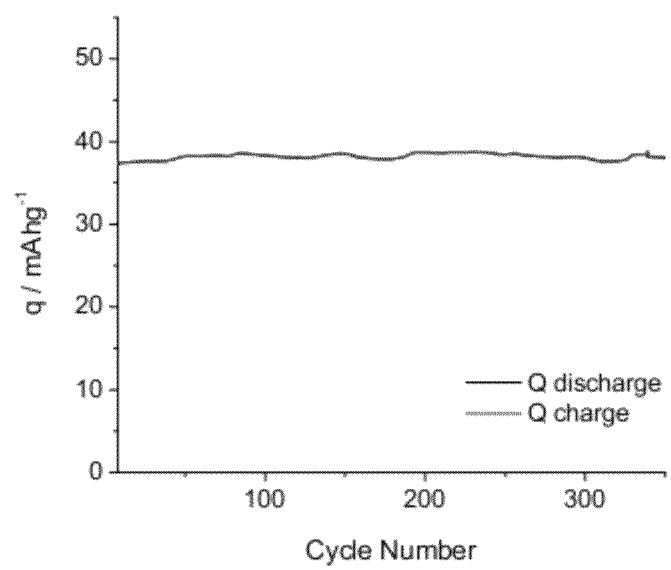
FIG. 27 illustrates long term cycling (350 cycles) of a NiHCF/AC full cell in 1 M $K^+$ at pH=1, according to an embodiment of the invention.

FIG. 26 illustrates long term cycling (450 cycles) of a NiHCF/AC full cell in 1 M $Na^+$ at pH=1. The device exhibited excellent capacity retention, with about 3% capacity loss over 500 cycles at 10 C. FIG. 27 illustrates long term cycling (350 cycles) of a NiHCF/AC full cell in 1 M $K^+$ at pH=1. The device exhibited excellent capacity retention, with essentially no capacity loss over 350 cycles at 10 C.

Figure 28:
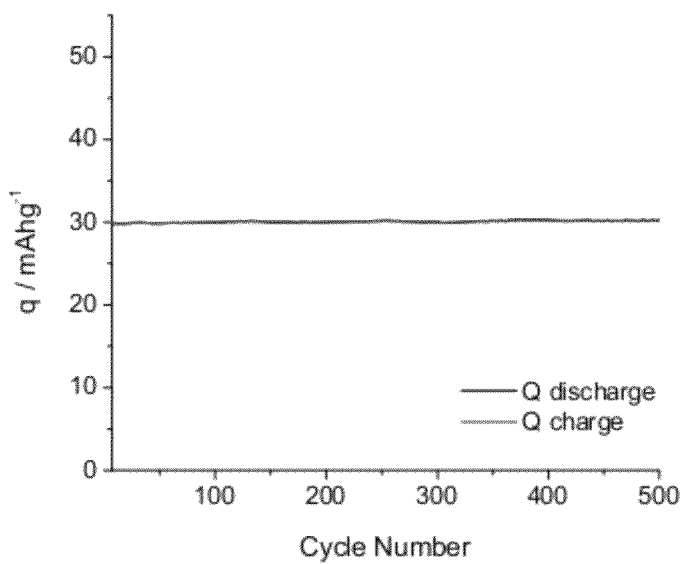
FIG. 28 illustrates long term cycling (500 cycles) of a CuHCF/AC full cell in 1 M $K^+$ at pH=1, according to an embodiment of the invention.
Figure 29:
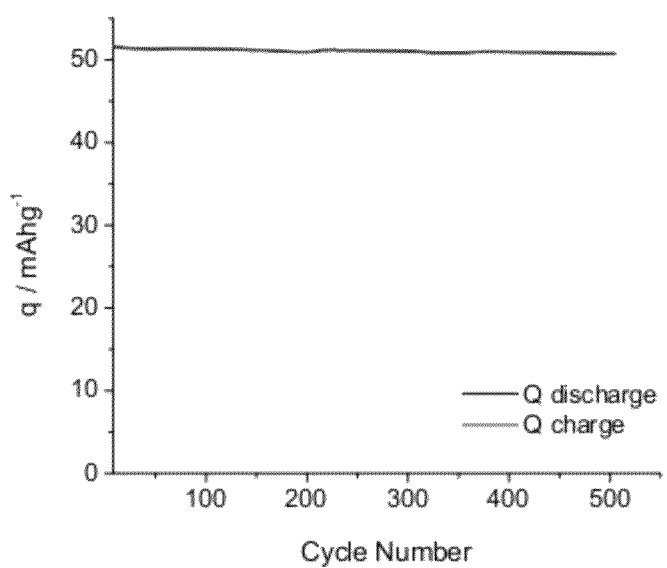
FIG. 29 illustrates long term cycling (500 cycles) of a CuHCF//AC/PPy full cell in 1 M $NH_4^+$ at pH=1, according to an embodiment of the invention.

FIG. 28 illustrates long term cycling (500 cycles) of a CuHCF/AC full cell in 1 M $K^+$ at pH=1. The device exhibited excellent capacity retention, with essentially no capacity loss over 500 cycles at 10 C. FIG. 29 illustrates long term cycling (500 cycles) of a CuHCF//AC/PPy full cell in 1 M $NH_4^+$ at pH=1. The device exhibited excellent capacity retention, with about 1.6% capacity loss over 500 cycles at 10 C.

Figure 30:
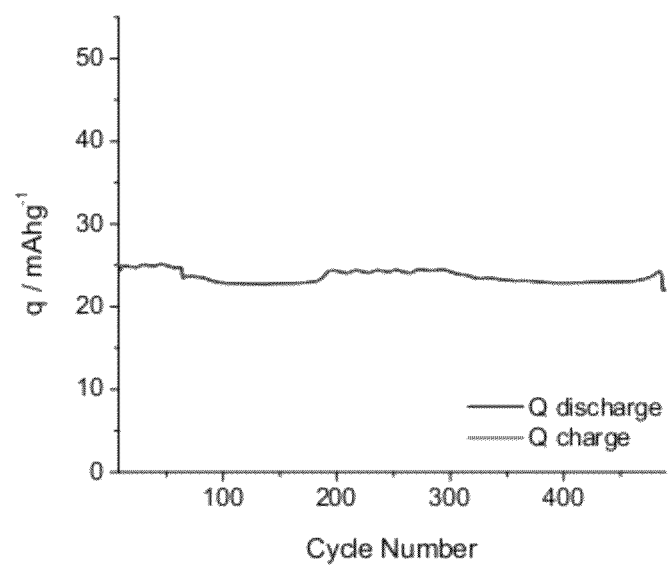
FIG. 30 illustrates long term cycling (500 cycles) of a CuFe(50%)HCF//AC/PPy full cell in 1 M $Na^+$ at pH=1, according to an embodiment of the invention.
Figure 31:
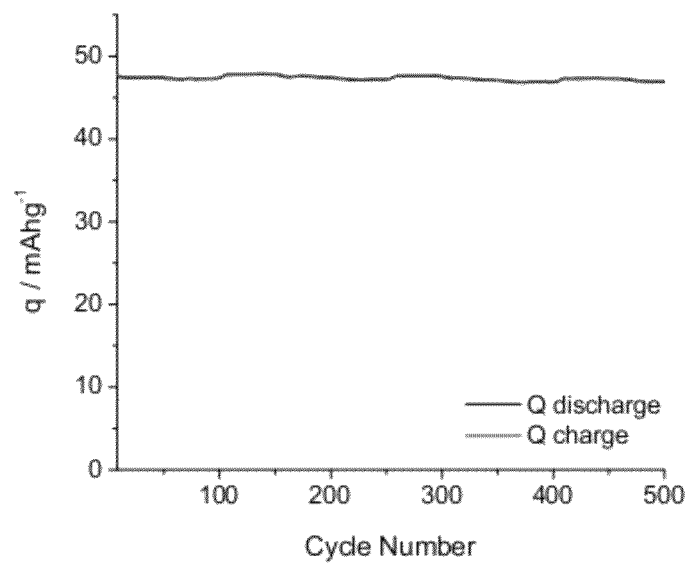
FIG. 31 illustrates long term cycling (500 cycles) of a CuFe(50%)HCF//AC/PPy full cell in 1 M $K^+$ at pH=1, according to an embodiment of the invention.

FIG. 30 illustrates long term cycling (500 cycles) of a CuFe(50%)HCF//AC/PPy full cell in 1 M $Na^+$ at pH=1. The device exhibited excellent capacity retention, with essentially no capacity loss over 500 cycles at 10 C. FIG. 31 illustrates long term cycling (500 cycles) of a CuFe(50%)HCF//AC/PPy full cell in 1 M $K^+$ at pH=1. The device exhibited excellent capacity retention, with about 1.5% capacity loss over 500 cycles at 10 C.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A battery comprising:
a cathode;
an anode; and
an aqueous electrolyte disposed between the cathode and the anode and including a cation A different from $Li^+$,
wherein at least one of the cathode and the anode includes an electrode material having a Prussian Blue crystal structure into which the cation A is reversibly inserted during operation of the battery, and
wherein the aqueous electrolyte has a pH that is less than 3.

2. The battery of claim 1, wherein the battery has a reference specific capacity when cycled at a reference rate of 1 C, and at least 75% of the reference specific capacity is retained when the battery is cycled at 10 times the reference rate.

3. The battery of claim 2, wherein at least 60% of the reference specific capacity is retained when the battery is cycled at 100 times the reference rate.

4. The battery of claim 2, wherein the battery has a reference, round-trip energy efficiency when cycled at the reference rate, and at least 85% of the reference, round-trip energy efficiency is retained when the battery is cycled at 10 times the reference rate.

5. The battery of claim 1, wherein the cation A is at least one of $Na^+$ and $Ba^{2+}$.

6. The battery of claim 1, wherein the cation A is at least one of $K^+$, $Rb^+$, $Cs^+$, and $NH_4^+$.

7. The battery of claim 1, wherein the cation A has a Stokes ionic diameter greater than 3.5 Å.

8. The battery of claim 1, wherein the electrode material is represented as:

$$A_xP_y[R(CN)_{6-w}L_w]_z$$

wherein
A is at least one alkali or alkaline earth metal cation,
P is at least one metal cation,
R is at least one metal cation,
L is an anion,
x, y, and z are related based on electrical neutrality,
x>0,
y>0,
z>0, and
0≤w≤6.

9. The battery of claim 8, wherein P is a cation of copper.

10. The battery of claim 8, wherein P includes cations of at least two different row 4 transition metals, and at least one of the transition metals is copper.

11. The battery of claim 8, wherein R is selected from cations of Fe, Mn, Cr, and Co.

12. The battery of claim 1, wherein at least one of the cathode and the anode includes a coating including the electrode material, and a thickness of the coating is at least 500 nm.

13. The battery of claim 12, wherein the thickness of the coating is at least 1 μm.

14. The battery of claim 1, wherein a mass loading of the electrode material within at least one of the cathode and the anode is at least 500 μg/cm$^2$.

15. The battery of claim 14, wherein the mass loading is at least 1 mg/cm$^2$.

16. The battery of claim 1, wherein the electrode material includes particles having a grain size no greater than 1 μm.

17. The battery of claim 16, wherein the grain size is no greater than 200 nm.

18. The battery of claim 1, wherein the pH is less than 2.

19. The battery of claim 1, wherein the aqueous electrolyte includes water as a primary solvent and at least one co-solvent having a reduced polarity relative to water.

20. The battery of claim 1, wherein the cathode includes the electrode material as a cathode material, and the anode includes an anode material into which the cation A is reversibly inserted during operation of the battery.

21. The battery of claim 1, wherein the cathode includes the electrode material, and the anode includes an electrochemical double-layer capacitor material.

22. The battery of claim 21, wherein the electrochemical double-layer capacitor material is activated carbon.

* * * * *